United States Patent
Schober et al.

(10) Patent No.: US 12,382,549 B2
(45) Date of Patent: Aug. 5, 2025

(54) SUDAS, URU AND BASE STATION

(71) Applicant: Fraunhofer-Gesellschaft zur Foerderung der angewandten Forschung e.V., Munich (DE)

(72) Inventors: Robert Schober, Dietenhofen (DE); Marco Breiling, Erlangen (DE); Aravindh Krishnamoorthy, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 665 days.

(21) Appl. No.: 17/209,773

(22) Filed: Mar. 23, 2021

(65) Prior Publication Data

US 2021/0212165 A1 Jul. 8, 2021

Related U.S. Application Data

(63) Continuation of application No. PCT/EP2018/075746, filed on Sep. 24, 2018.

(51) Int. Cl.
| | | |
|---|---|---|
| *H04W 88/04* | (2009.01) | |
| *H04B 7/155* | (2006.01) | |
| *H04L 5/00* | (2006.01) | |
| *H04W 52/34* | (2009.01) | |
| *H04W 52/46* | (2009.01) | |
| *H04W 76/14* | (2018.01) | |

(52) U.S. Cl.
CPC ........ *H04W 88/04* (2013.01); *H04B 7/15542* (2013.01); *H04L 5/0098* (2013.01); *H04W 52/346* (2013.01); *H04W 52/46* (2013.01); *H04W 76/14* (2018.02)

(58) Field of Classification Search
CPC ... H04W 88/04; H04W 52/346; H04W 52/46; H04W 76/14; H04B 7/15542; H04B 7/0456; H04L 5/0098
See application file for complete search history.

(56) References Cited

U.S. PATENT DOCUMENTS

2017/0163333 A1* 6/2017 Breiling .................. H04W 4/06

FOREIGN PATENT DOCUMENTS

| EP | 2991441 A2 | 3/2016 |
|---|---|---|
| WO | 2016030300 A1 | 3/2016 |
| WO | 2016030394 A2 | 3/2016 |

OTHER PUBLICATIONS

Wing et al. "Energy-Efficient 5G Outdoor-to-Indoor Communication: SUDAS Over Licensed and Unlicensed Spectrum," 2015, IEEE.*

(Continued)

*Primary Examiner* — Brian S Roberts
(74) *Attorney, Agent, or Firm* — Perkins Cole LLP; Michael A. Glenn

(57) ABSTRACT

A SUDAS has at least one URU, wherein the at least one URU is configured for relaying a signal between at least one base station and at least one user equipment by communicating with the at least one user equipment in a first frequency range and with at least one base station in a second frequency range. The SUDAS has a controller configured for determining a first solution for a resource allocation in the first frequency range. The base station is configured for determining a second solution for a resource allocation in the first frequency range using the first solution.

10 Claims, 11 Drawing Sheets

(56) References Cited

OTHER PUBLICATIONS

Guo et al "Enhancing Cellular Performance through Device-to-Device Distributed MIMO," Aug. 23, 2018, IEEE.*
"NGMN 5G white paper", NGMN Alliance, Next Generation Mobile Networks Ltd, Frankfurt am Main, 2015, 2015, 125 pp.
Almers, P, et al., "Keyhole effect in MIMO wireless channels: Measurements and theory", IEEE Trans. Wireless Commun., vol. 5, No. 12, 2006, 8 pp.
Bezdek, J. C, et al., "Convergence of alternating optimization", Neural, Parallel & Scientific Computations, vol. 11, No. 4, pp. 351-368, 2003, Dec. 2003, pp. 351-368.
Breiling, Marco, et al., "Resource allocation for outdoor-to-indoor multicarrier transmission with shared UE-side distributed antenna systems", Vehicular Technology Conference (VTC Spring), 2015 IEEE 81st, 2015, pp. 1-7, pp. 1-7.
Choi, Wan, et al., "Downlink performance and capacity of distributed antenna systems in a multicell environment", Trans. Wireless Communications, vol. 6, No. 1, 2007, 5 pp.
Dohler, Mischa, et al., "Link capacity analysis for virtual antenna arrays", Centre of Telecommunications Research King's College London, vol. 1, pp. 440-443 vol.1, 2002, pp. 440-443.
Dohler, Mischa, et al., "Virtual antenna arrays", Ph.D. dissertation, King's College London, University of London, Nov. 2003, 208 pp.
Goodarzi, "Resource Allocation in a Distributed Antenna System", Institute for Digital Communications, Jan. 9, 2017, Jan. 9, 2017, 52 pp.
Goodarzi, Meysam, et al., "Resource Allocation for Outdoor-to-Indoor Amplify-and-Forward SUDAS with Independent Relay Processing", XP 002792523, 6 pp.
Jaeckel, Stephan, et al., Uploaded in 5 parts "QuaDRiGa-Quasi Deterministic Radio Channel Generator, User manual and documentation", Fraunhofer Heinrich Hertz Institute, 2014, 25 pp.
Krishnamoorthy, Aravindh, et al., "Krishnamoorthy et al., Resource Allocation for Outdoor-to-Indoor Compress-and-Forward SUDAS with Independent Relay Processing", Fraunhofer Institute for Integrated Circuits (IIS), Erlangen, Germany., 7 pp.
Maltsev, A, et al., "Statistical channel model for 60 Ghz WLAN systems in conference room environment", Intel Corporation, Wireless Standards and Technology Group and N.I. Lobachevsky State University of Nizhny Novgorod, Wireless Competence Center, pp. 1-5.
Ng, Derrick Wing Kwan, et al., "Energyefficient 5G outdoor-to-indoor communication: SUDAS over licensed and unlicensed spectrum", IEEE Trans. Wireless Communications, vol. 15, No. 5, pp. 3170-3186, 2016, pp. 3170-3186.
Rong, Yue, et al., "A unified framework for optimizing linear nonregenerative multicarrier MIMO relay communication systems", IEEE Trans. Signal Process., vol. 57, No. 12, pp. 4837-4851, 2009, pp. 4837-4851.
Wang, Xin, et al., "Resource allocation for wireless multiuser OFDM networks", IEEE Trans. Inf. Theory, vol. 57, No. 7, pp. 4359-4372, 2011, pp. 4359-4372.
Yu, Wei, et al., "Dual methods for nonconvex spectrum optimization of multicarrier systems", IEEE Trans. Communications, vol. 54, No. 7, pp. 1310-1322, 2006, pp. 1310-1322.

* cited by examiner

1) $URU_1$

2) $URU_3$

3) $URU_2$

⋮

M) $URU_M$ ental Application No. PCT/EP2018/075746, filed Sep. 24, 2018, which is incorporated herein by reference in its entirety.

BACKGROUND OF THE INVENTION

The present invention concerns the field of wireless communication networks or systems, more specifically concepts for relaying a signal in wireless communication networks or systems. The present invention refers to a Shared User Equipment (UE)-side distributed antenna system (SUDAS) comprising UE-side radio units (URU) for relaying signals between a base station and a UE. The present invention further relates to a concept for handling and controlling a SUDAS being a shared relaying system useful for 5G and next generation automotive and mobile broadband services.

High data rate outdoor-to-indoor communication and indoor coverage are crucial requirements for next generation communication systems [7]. For high data rate applications, the use of multiple-input multiple-output (MIMO) systems is promising whereby the availability of multiple spatial streams greatly increases the throughput of the system. However, outdoor-to-indoor communication using conventional MIMO is ineffective due to keyhole effect and large penetration losses which effectively reduce the achievable data rates [8]. Furthermore, due to the size constraints of user equipments (UEs), the number of antennas that a UE can accommodate is also limited. Hence, UEs are unable to take advantage of spatial diversity to mitigate the losses.

Virtual Antenna Arrays (VAAs) [9], [10] have been proposed to tackle this problem whereby multiple UEs cooperate during reception, acting as virtual antennas for each other, in order to achieve a virtual MIMO gain. Similarly, the concept of distributed antenna system (DAS) has been proposed for the base station (BS) side [11], where the distributed antennas are connected to a BS using high speed fronthaul links.

Shared UE-side Distributed Antenna System (SUDAS) [12] is a combination of the VAA and DAS concepts for the UE-side. SUDAS consists of a number of virtual antennas (or relays) which act as a shared UE-side DAS. In order to forward a MIMO signal from an outdoor BS to the indoor UEs, the SUDAS Amplify-and-Forward (AF) relays, located in the indoor environment, shift the signal from a licensed band, typically in a sub-6 GHz region, to an indoor unlicensed band such as the millimeter wave (mm-Wave) band located around 60 GHz. The mm-Wave band is well suited for short-range indoor applications owing to its high pathloss (avoiding interference outside the indoor environment), and large band-width (about 7 GHz in the 60 GHz band). In order to take advantage of the large bandwidth, the relays use frequency repetition and frequency division multiple access (FDMA) in the unlicensed band alongside amplification. Therefore, SUDAS converts the potential outdoor spatial multiplexing gain to an indoor frequency multiplexing gain.

Resource allocation in such hybrid system can significantly improve the throughput of the system. In [12], [13], resource allocation for SUDAS with AF relays has been analyzed for the case where the relays are capable of joint processing. However, joint processing entails high-speed interconnects between the relays to exchange the received MIMO signals, thereby increasing cost and reducing deployment flexibility. Therefore, resource allocation for performance analysis of SUDAS with independently operating relays is of interest. Under the independent relay model, the relays do not exchange the received MIMO signals, however, they may exchange a small amount of control information e.g. via low-cost indoor power line communication.

FIG. 1 is a schematic representation of an example of such a network infrastructure, like a wireless communications system including a plurality of base stations or evolved NodeBs $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT (Internet-of-Things) devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $100_2$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station eNB4 to receive and transmit data as schematically represented by arrow $105_1$. The IoT device $104_2$ accesses the wireless communication system via the user $UE_3$ as is schematically represented by arrow $105_2$. $UE_1$, $UE_2$ and $UE_3$ may access the wireless communications system or network by communicating with the base station.

The wireless communications network system may be any single-carrier or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without cyclic prefix (CP), e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined 20 by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix length.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain.

The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to the control region, are represented by the hatched boxes 103. In accordance with examples, resource elements 103 may be allocated to the PDCCH, to the physical control format indicator channel (PCFICH), and to the physical hybrid ARQ indicator channel (PHICH). A resource in agreement with embodiments may relate to one or more communication parameters to be used or set for communication such as frequency, time, code, spatial diversity/direction, transmission power, phase/polarization or the like. The cross-hatched boxes 107 represent resource elements which are allocated to the RS that may be used for the channel estimation. The black boxes 108 represent unused resources in the current antenna port that may correspond to RSs in another antenna port. The resource elements 103, 107, 108 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

In the network illustrated in FIG. 1 UEs and/or IoT devices may face a so-called indoor scenario in which a direct link to the base station has limited quality. Relays may be used so as to forward signals between the UE/IoT device and the base station.

It is an object of the present invention to provide for a concept that allows a high quality of communication between the base station and a user equipment.

SUMMARY

In accordance with an embodiment, a SUDAS having at least one URU, wherein the at least one URU is configured for relaying a signal between at least one base station (BS) and at least one User Equipment (UE) by communicating with the at least one UE in a first frequency range and with the at least one BS in a second frequency range, may have: a controller configured for determining a first solution for a resource allocation in the first frequency range; wherein the base station is configured for determining a second solution for a resource allocation in the second frequency range using the first solution.

Another embodiment may have a URU configured for operating in a SUDAS having at least the URU, wherein the URU is configured for relaying a signal between at least one base station (BS) and at least one User Equipment (UE) by communicating with the at least one UE in a first frequency range and with the at least one BS in a second frequency range, the URU having a controller configured for determining a first solution for a resource allocation in the first frequency range.

Another embodiment may have a base station (BS) configured for operating in a SUDAS having at least one URU, wherein the at least one URU is configured for relaying a signal between the BS and at least one User Equipment (UE) by communicating with the at least one UE in a first frequency range and with the BS in a second frequency range, the BS having a controller configured for: determining a first solution for a resource allocation in the first frequency range and a second solution for a resource allocation in the second frequency range; and controlling the at least one URU according to the first solution.

According to another embodiment, a URU configured for operating as a relay for relaying a part of a input signal received from a base station (BS) through a backend link to a User Equipment (UE) through a frontend link, wherein the frontend link is established in a frontend frequency band providing a plurality of frontend resources, may have: a first interface for receiving the input signal from the base station, the signal using a plurality of resources; a signal generator configured for selecting a subset of resources from the plurality of resources and to provide an output signal using the selected subset of resources; and a second interface for transmitting the output signal to the UE.

Another embodiment may have a User Equipment (UE) configured for receiving an allocation signal containing information indicating resources available at a base station (BS) to which the UE is associated and which are allocated to the UE; wherein the UE is configured for transmitting to a URU selection information indicating the allocated resources.

According to still another embodiment, a URU configured for operating as a relay for relaying at least a part of an input signal received from a base station (BS) to a User Equipment (UE), may have: a first interface for receiving the input signal from the base station, the input signal having payload data; a signal generator configured for incrementally coding the payload data so as to obtain a plurality of incremental payload partitions, and for providing an output signal by coding the plurality of incremental payload partitions; and a second interface configured for transmitting the output signal.

According to another embodiment, a UE configured for receiving a signal from a URU, the signal having payload data being incrementally coded with a plurality of incremental code partitions, may have: a decoder configured for decoding the signal so as to obtain decoded payload partitions from the signal based on the incremental code partitions; an evaluator configured for evaluating if a payload partition has been decoded successfully or unsuccessfully;

and a combiner configured for combining payload partitions being decoded successfully so as to obtain decoded payload data based on the successfully decoded combined payload partitions.

According to a first aspect of the present invention, the inventors have found that a high communication quality may be obtained by determining a first resource allocation between the relay and the UE and a second resource allocation between the base station and the relay. Thereby, a high quality may be obtained in simple networks of one base station, one URU and one UE which, at the same time, remains scalable, in particular in view of a plurality of base stations being possibly non-cooperative.

According to an embodiment of the first aspect, a SUDAS comprises at least one URU, wherein the at least one URU is configured for relaying a signal between at least one base station (BS) and at least one UE by communicating with the at least one UE in a first frequency range, possibly above 6 GHz, and with the at least one BS in a second frequency range, possible sub-6 GHz. The SUDAS comprises a controller configured for determining a first solution for a resource allocation in the first frequency range. The base station is configured for determining a second solution for a resource allocation in the second frequency range using the first solution, i.e., the resource allocation in the second solution may at least be influenced by the first solution. This two-step approach allows for high quality communication.

According to a second aspect of the present invention, the inventors have found that by combining information characterizing a frontend link, known generally as channel state information (CSI), between the relay and the UE and backend information characterizing a backend link between the base station and the relay to a hybrid parameter, resource allocation at the base station may be based on channel conditions of both, the frontend link and the backend link whilst avoiding excessive overhead for separately signaling information of a possibly high number of frontend links such that this information may be considered to obtain a high quality communication whilst avoiding excessive overhead.

According to an embodiment of the second aspect, a SUDAS comprises at least one URU, wherein the at least one URU is configured to relaying a signal between a base station and a user equipment. A backend channel between the base station and the URU is characterized by a backend parameter. A frontend channel between the URU and the UE is characterized by a frontend parameter. The SUDAS is configured for determining a hybrid parameter using the frontend parameter and the backend parameter. The base station is configured for allocating resources for the backend link based on the hybrid parameter. This allows for considering frontend needs in the resource allocation of the backend links whilst avoiding excessive overhead so as to allow for a high quality communication.

According to an embodiment of the second aspect, a controller is configured for controlling a SUDAS comprising a base station, a user equipment and a URU. The controller comprises an input interface for receiving information indicating a backend parameter characterizing a backend channel between the base station and the URU and for receiving a frontend parameter characterizing a frontend channel between the URU and the UE. The controller comprises a processor for determining a hybrid parameter using the frontend parameter and the backend parameter. The controller further comprises an output interface for providing the hybrid parameter.

According to a third aspect of the present invention, the inventors have found that by utilizing only a subset of possible BS-URU-UE-links by selecting a subset of available URUs, a use of resources may be comparatively low so as to allow a high quality in communication whilst avoiding use of low-quality links.

According to an embodiment of the third aspect, a SUDAS comprises a plurality of URU, wherein each URU is configured for relaying a signal between a base station and a user equipment. The SUDAS comprises a controller configured for selecting at least one URU of the plurality of URU for relaying the signal and for controlling the selected URU so as to relay the signal and for controlling an unselected URU so as to not relay the signal.

According to an embodiment of the third aspect, a URU is configured for communicating with a base station using a first frequency band and for communicating with a UE using a second frequency band so as to relay a signal between the UE and the BS. The URU comprises an interface for receiving information related to at least one further URU configured for relaying a signal between the base station and a same or different UE, wherein the URU and the at least one further URU forms a plurality of URU. The URU comprises a controller configured for selecting at least one URU of the plurality of URU for relaying the signal and for controlling the selected URU so as to relay the signal and for controlling an unselected URU so as to not relay the signal.

According to an embodiment of the third aspect, a UE is configured for communicating with a base station. The UE comprises an interface for receiving information relating to a plurality of URU configured for relaying a signal between the base station and the UE. The UE comprises a controller configured for selecting at least one URU of the plurality of URU for relaying the signal and for controlling the selected URU so as to relay the signal and for controlling an unselected URU so as to not relay the signal.

According to an embodiment of the third aspect, a base station is configured for communicating with a UE. The base station comprises an interface for receiving information relating to a plurality of URU configured for relaying a signal between the base station and the UE. The base station comprises a controller configured for selecting at least one URU of the plurality of URU for relaying the signal and for controlling the selected URU so as to relay the signal and for controlling an unselected URU so as to not relay the signal.

According to a fourth aspect of the present invention, the inventors have found that a high quality of communication may be obtained by saving resources between the URU and the UE although a general availability of resources or bandwidth may be higher between the URU and the UE when compared to a bandwidth between the base station and the URU.

According to an embodiment of the fourth aspect, a URU is configured for operating as a relay for relaying a part of an input signal received from a base station to a user equipment. The URU comprises first interface for receiving the input signal from the base station using a plurality of resources. The URU comprises a signal generator configured for selecting a subset of resources from the plurality of resources and to provide an output signal using the selected subset of resources. The URU comprises a second interface for transmitting the output signal to the UE. This allows to avoid occupation of resources undedicated to the UE when forwarding the signal to the UE and therefore for saving resources and thus allows for a high quality of communication.

According to an embodiment of the fourth aspect, a user equipment is configured for receiving an allocation signal containing information indicating resources available at the base station to which the UE is associated and which are allocated to the UE. The UE is configured for transmitting to a URU selection information indicating the allocated resources.

According to a fifth aspect, the inventors have found that a relay may also provide functionality of a decentralized broadcasting station by implementing the relay so as to incrementally code a signal to be forwarded. This allows for a high quality of information as each receiver may decode a respective amount of data.

According to an embodiment of the fifth aspect, a URU is configured for operating as a relay for relaying at least a part of an input signal received from a base station to a user equipment. The URU comprises a first interface for receiving the input signal from the base station, the input signal comprising payload data. The URU comprises a signal generator configured for incrementally coding the payload data so as to obtain a plurality of incremental payload partitions, and for providing an output signal by coding the plurality of the incremental payload partitions. The URU comprises a second interface configured for transmitting the output signal.

According to an embodiment of the fifth aspect, a UE is configured for receiving a signal from a URU, the signal comprising payload data being incrementally coded with a plurality of incremental code partitions. The UE comprises a decoder configured for decoding the signals so as to obtain decoded payload partitions from the signal based on the incremental code partitions. The UE comprises an evaluator configured for evaluating if a payload partition has been successfully or unsuccessfully decoded. The UE comprises a combiner configured for combining payload partitions being successfully decoded so as to obtain decoded payload data based on the successfully decoded combined payload partitions.

Further embodiments of the present invention relate to methods, computer program products and networks in connection with the above identified aspects.

BRIEF DESCRIPTION OF THE DRAWINGS

Embodiments of the present invention are now described in further detail with reference to the accompanying drawings, in which.

DETAILED DESCRIPTION OF THE INVENTION

In the following, embodiments of the present invention are described in further detail with reference to the enclosed drawings in which elements having the same or a similar function are referenced by the same reference signs.

Although, in the following, reference is made to OFDM networks and/or LTE networks, embodiments described herein are not limited hereto. Without any limitation, a single-carrier transmission system may be implemented.

Figure 3:
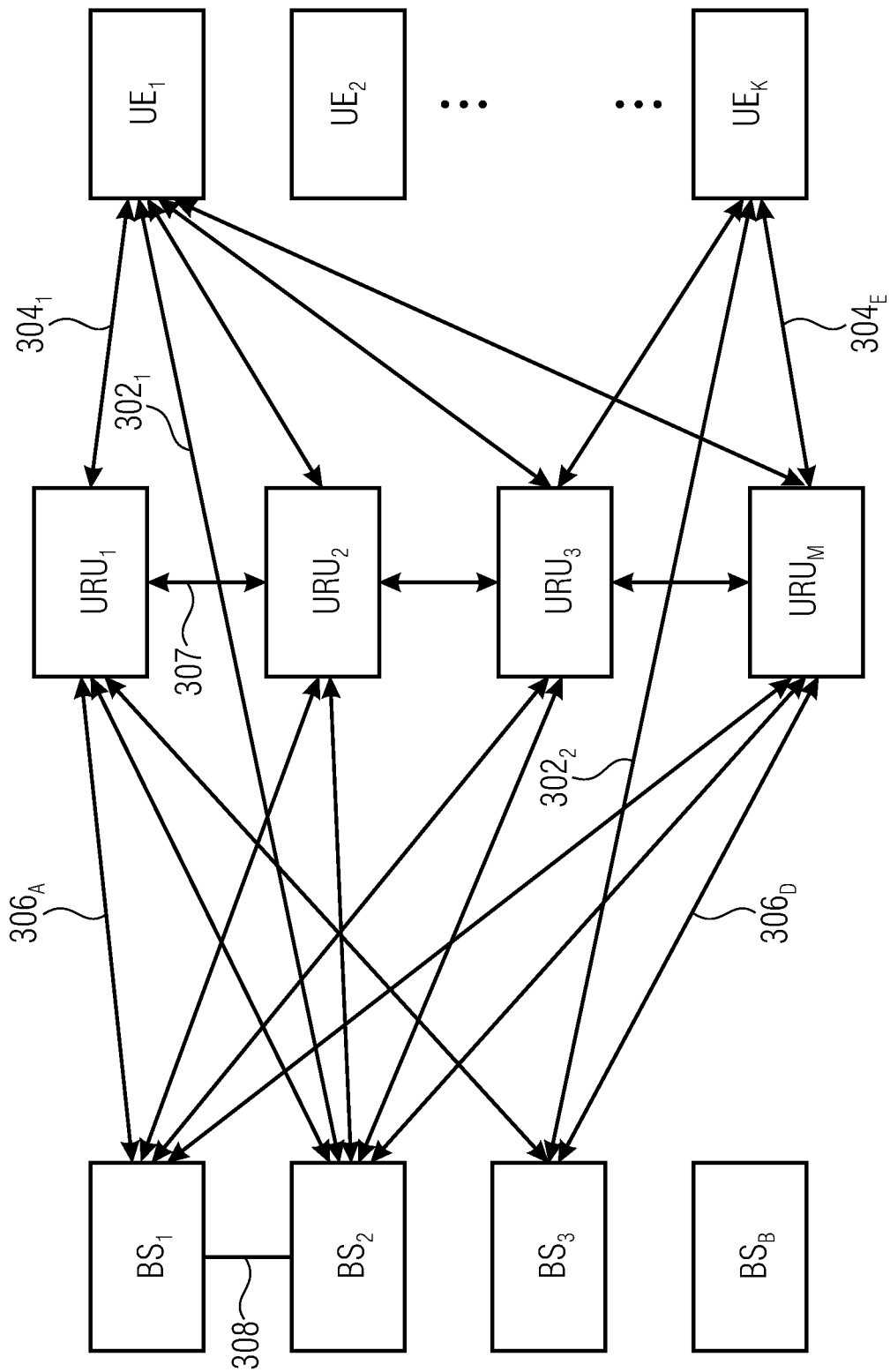
FIG. 3 shows a schematic block diagram of a SUDAS according to embodiments of the aspects described herein.

FIG. 3 shows a schematic block diagram of a SUDAS 300 (Shared User Equipment (UE)-side distributed antenna system) being an example network according to embodiments of the aspects described herein. Embodiments of the present invention are advantageous for networks comprising at least one base station (BS; eNB), at least one user equipment (UE) and at least one UE-side radio side unit (URU) relaying signals between the BS and the UE, embodiments are especially advantageous for networks comprising a plurality of UE, URU and/or BS, in particular a plurality of BS which are non-cooperative. Non-cooperative base stations may operate their respective network or network cell with low or even no coordination with respect to this operation. An example for such non-cooperative base stations may be implemented by different service providers operating their networks independently from each other. According to an embodiment, multiple non-cooperative BSs can exist, e.g., when the indoor users are subscribed to different network operators, for example, with at least one BS per operator. The SUDAS may obtain indoor signals from all the BSs and forward them to the UEs. In case of multiple non-cooperative BSs, the SUDAS-transparent mode may ensure coordination across different operators. In such a case, the SUDAS controller obtains the parameters corresponding to each BS from the associated UEs and performs indoor allocation as described in connection with embodiments. To the SUDAS controller, it does not matter that the signals are coming from multiple BSs as it is assumed that the multiple BSs to do not overlap in frequency. In case they do overlap in frequency, then the system mode may be extended accordingly.

Figure 1:
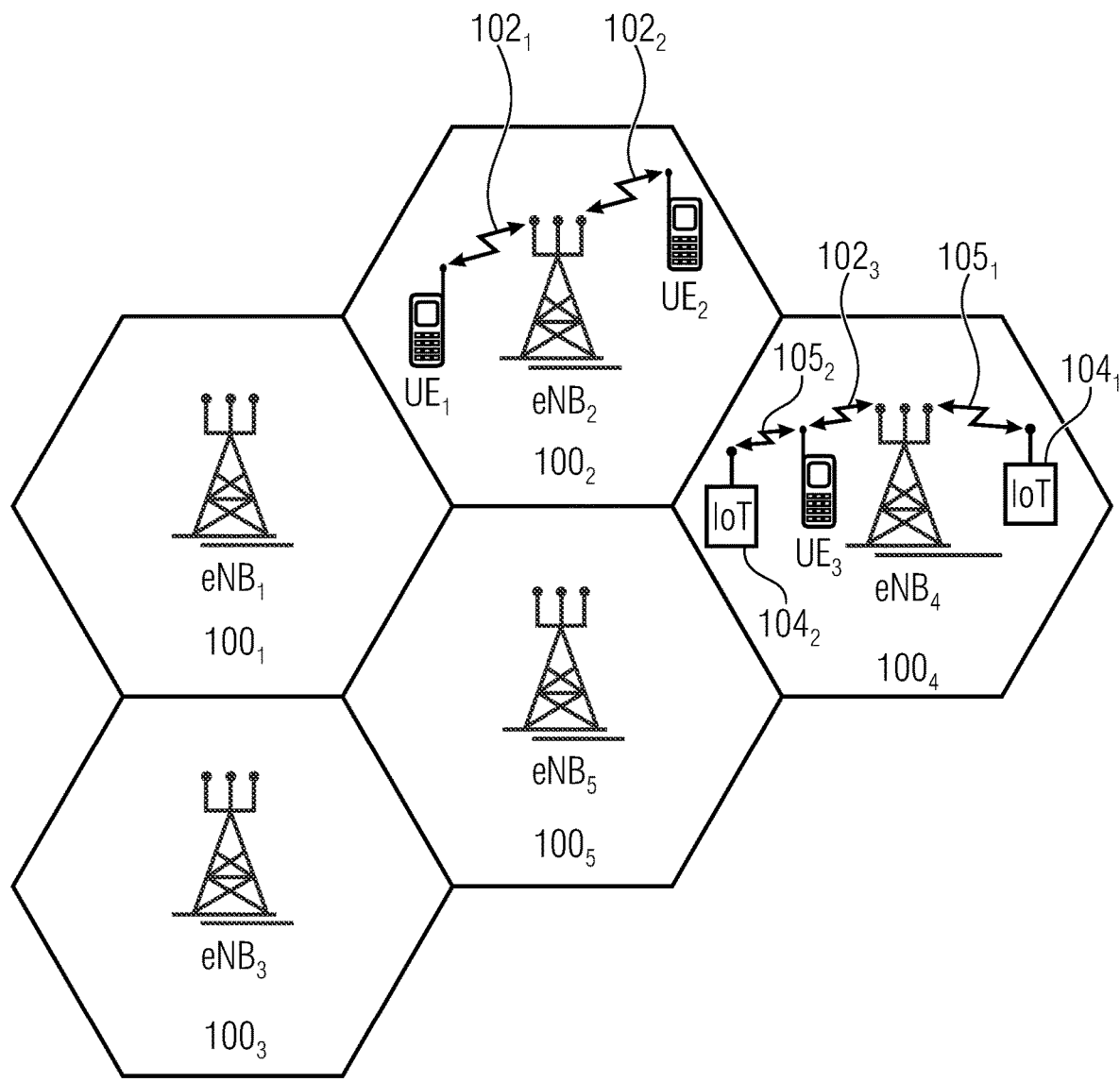
FIG. 1 shows a schematic representation of an example network infrastructure according to an embodiment.
Figure 2:
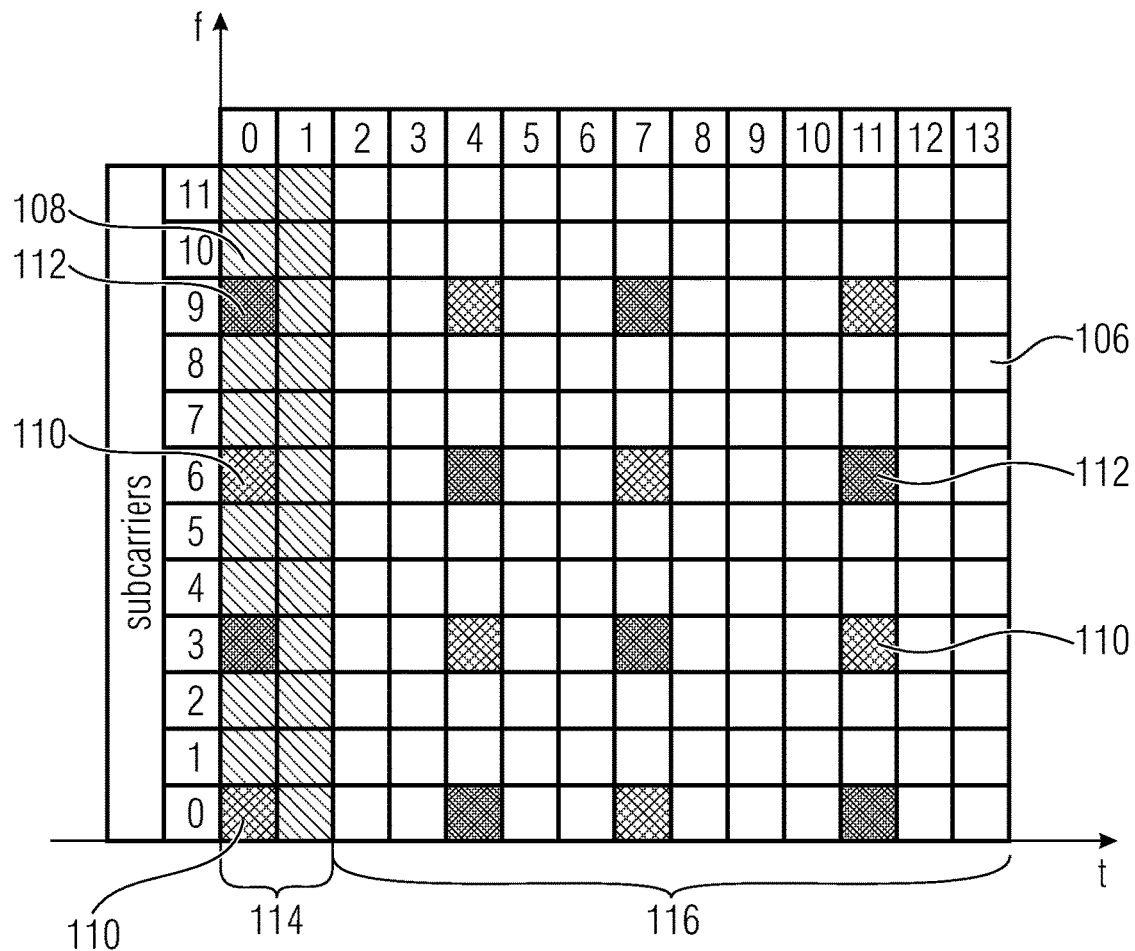
FIG. 2 shows an exemplary LTE OFDMA-based subframe with two antenna ports for different selected Tx antenna ports according to an embodiment.

The SUDAS 300 comprises base stations $BS_1$ to $BS_B$, wherein B may be any number larger than 0, e.g., 1, 2, 3, 4, 5 or more, 10 or more or even a higher number. The SUDAS 300 further comprises $URU_1$ to $URU_M$ with being any number larger than 0, for example, 1 or more, 2 or more, 3 or more, 4 or more, 5 or more, 10 or more, or even a higher number. The SUDAS 300 further comprises a number of K user equipments $UE_1$ to $UE_K$ with K being and number larger than 0, for example, 1 or more, 2 or more, 3 or more, 4 or more, 5 or more, 10 or more, or even a higher number. One or more of the UE SUDAS 300 may be implemented as an IoT device 104 described in connection with FIG. 1. One or more of the base stations $BS_1$ to $BS_B$ may be implemented as described in connection with eNB in FIG. 1.

A base station and an associated UE may communicate with each other directly through direct communication links 302. For example, $BS_2$ may directly communicate with $UE_1$ using the direct communication link $302_1$. $UE_K$ may communicate with base station $BS_3$ directly using the direct communication link $302_2$.

Alternatively or in addition to a direct communication link 302, a UE may communicate with a BS indirectly using one or more URUs. Each URU may establish and maintain one or more frontend communication links 304 and may communicate with an application, service or UE through each of the frontend communication links. I.e., a URU may maintain one or more frontend communication links with a single UE, wherein numbers of two or more may occur, for example, when different application or services of the UE entail separate communication.

A URU may comprise an interface for receiving information relating to at least one further URU. For example, a URU may communicate with a base station or a UE or with one or more other URUs directly using communication links 307. Thereby, information relating to at least one further URU, for example, the links maintained thereby, may be exchanged. The controller being arranged at least partially at the base station may be implemented by implementing an interface for receiving information relating to a plurality of URUs at the base station. Same implementation may be realized when implementing the controller at least partially at a UE or a base station, a respective interface may be implemented for receiving information relating to the plurality of URUs.

Further, each URU may maintain one or more backend communication links 306 with a same or different base station. For example, a UE such as $UE_1$ may be associated with $BS_2$ and may directly communicate with $BS_2$ via the direct communication link $302_1$ and may further communicate with the $BS_2$ via $URU_1$, $URU_2$, $URU_3$ and $URU_M$.

$BS_1$ and $BS_2$ may be cooperative base stations, for example, operated by a same service provide and may communicate with each other through a backhaul communication link 308. This may allow $UE_1$ for communicating with $BS_2$ via $BS_1$ using the backend communication link 306, established between $BS_1$ and $URU_1$ to which $UE_1$ has established a frontend communication link $304_1$.

In other words, as shown in FIG. 3, an installation of SUDAS comprises a number of B number of base stations, a number of M URU that may also be referred to as SUDAC and a number of K UE. The links between the BS and the URU are referred to as backend links, while links between the URU and the UE are termed frontend links. The number of BS may belong to the same operator or to a different set of operators. The BS belonging to the same operator may allow coordination between each other, e.g., exchange of control signals, as shown between $BS_1$ and $BS_2$. Each BS may be equipped with a number of $N_b$ with b equal to 1, 2, . . . , X. The antennas are capable of transmission and reception in the sub-6 GHz range, which is, without restriction, the typical transmission frequency of LTE (long term evolution) or LTE-advanced/pro base stations. The BS may transmit a multi-carrier MIMO (multiple input multiple output) signal are assumed to be non-overlapping, i.e., operating in different frequency bands in the sub-6 GHz range causing no or an acceptable level of interference to each other. Each BS may be capable of receiving a multi-carrier MIMO and/or a single carrier signal such as a DFT-S-OFDM signal. The URU may be assumed to contain antennas capable of reception and transmission in the sub-6 GHz frequency range for communication with the BS, and a second frequency range (out of band with respect to the sub-6 GHz frequency range), e.g., millimeter wave (mm-Wave), terahertz and/or visible-like frequency range, for communication with the UEs. The URUs may further be equipped with ASICs (application specific integrated circuit) and/or processors capable of controlling and data processing. Furthermore, the URUs are capable of operating in at least two modes. In a first mode that may also be referred to as joint processing, the URUs are capable of exchanging both data and control information, while in the second mode that may be referred to as independent processing, the URUs are capable of exchanging only the control signals and for processing the data independently, for example, for a powerline communication, wired or wireless interconnects operating in mm-Wave.

Furthermore, URUs may be referred to as relays in the traditional sense. Therefore, each URU may be configured in a variety of relaying schemes such as:
  a) amplify and forward (AF), where the relays amplify the received signal and forward it;
  b) quantize/compress and forward (Q/CF), where the relays quantize and additionally compress the signal, re-encode it to produce UE-specific signals (or additional processing) and forward it; and
  c) decode and forward (DF), where the relays decode the signal, re-encode to produce UE-specific signals and forward the re-encoded signals.

The UEs are assumed to contain antennas capable of transmission and reception in the sub-6 GHz frequency range for direct communication with the BS, and antennas capable of transmission and reception in the secondary frequency range for communication with the URUs. Furthermore, UEs may be equipped with ASICs and/or processors to carryout reception of the signal transmitted from the BS or from the URUs.

Furthermore, a SUDAS may comprise a SUDAS Controller (SCON) that may be a real or virtual entity that controls SUDAS operation. SCON may be located in a centralized unit at the SUDAS installation, a base station, a UE and/or a URU or may be distributed in the UE SUDAS, URU and/or the base stations. SCON may be capable of performing one or more of the following:
  a) setting up the transmission and reception parameters (i.e., resource allocation) at the BSs including beamforming (precoding), power allocation for the sub-carriers in a multi-carrier system, allocation of the sub-carriers to the UEs;
  b) setting up the transmission and reception parameters (i.e., resource allocation) at the URUs including selection of the relay channel, e.g., mm-Wave, terahertz, visible light (Li-Fi) detection of UEs connected to SUDAS, power, frequency, time slot allocation on the URU-UE links (frontend communication links); and
  c) setting up the transmission and reception parameters at the UEs.

The parameters for various links may be chosen by SCON optimally based on resource allocation algorithms such as described in [1], [2] or [3]. The optimal parameters may be chosen based on a design criteria such as to maximize throughput, to minimize the overall energy consumption and/or to ensure a minimum throughput to all users. Thereby, a SUDAS deployment as described in [4], [5] and/or [6] is extended.

A first technical challenge addressed by the first aspect of the present invention refers to the aspect that the known methods for parameter selection (i.e., resource allocation) as described in [1], [2] and [3] entail a tight coordination between the UEs, the URUs and the BSs and possibly a centralized resource allocation scheme. However, in the presence of multiple and possibly non-cooperating BSs, the existing methods are not applicable. Therefore, embodiments according to the first aspect provide for a functionality of the SCON to perform parameter selection, in particular in the presence of multiple non-cooperating BSs.

A second technical challenge addressed by the second aspect of the present invention is based on that the channel state information (CSI) corresponds to the properties of a respective channel such as channel coefficients, SNRs (signal-to-noise-ratios), quality indicators, interference power or the like, which help optimizing the parameters of the various links. In schemes described in [1], [2], and [3], SCON is assumed to have access to all CSI parameters of all links although in practice the CSI parameters may be quantized, outdated, hardcoded, or initialized one-time during setup of the SUDAS. Further, it is shown that access to all CSI is entailed for optimal parameter selection. However, in a practical deployment, some parts of SCON are possibly deployed on the BS, especially the parts concerning the parameter selection of the BS-URU links. Alternatively, SCON may be completely deployed on the BS. As described earlier, this entails the presence of all CSI at the BS. However, CSI is usually computed at the URU and UEs and provided or fed back to the BS. In the absence of a SUDAS, i.e., with UEs directly communicating the BS, the feedback may comprise or even consist of CSI for the BS-UE links. However, in the presence of SUDAS, the CSI may comprise BS-URU links and URU-UE links which increases the feedback overhead to the BS. Even neglecting the CSI exchange between the UEs and URUs due to the availability of a large bandwidth and high associated rates, this may entail that the feedback between the URUs and the BSs, occurring in the sub-6 GHZ band to be minimized for efficient communication. Therefore, an aim of the second aspect is to develop a technique where the amount of CSI sent from the URUs to the BSs is low or even as low as possible, for example, at most the same as would be entailed for the BS-UE links, so that CSI feedback may be implemented efficiently even in the presence of SUDAS.

A third technical challenge addressed by embodiments of the third aspect of the present invention is based on the fact that URU are low-cost devices such that they are typically deployed in large numbers in an indoor or vehicular environment, e.g., fixed on the celling or integrated into devices such as power sockets or electrical applications. As shown in FIG. 3, the UEs receive signals from multiple URUs and combine them to perform MIMO decoding. Increasing the number of URUs Imposes a higher computational complexity at the UEs. Furthermore, increasing the number of URUs has a progressively diminishing increase to the net throughput as shown in [1] or [3]. However, a large number of URUs may be used as some of the URUs may be unusable due to blockages in the BS-URU or URU-UE links, especially in SUDAS deployments in large areas such as a football field or a train station. Therefore, a requirement may be seen for the SCON to consider a trade-off between parameters such as UE computational complexity, achievable throughput, expended energy and selection of a subset of URUs that shall serve as a UE.

A fourth technical challenge addressed by embodiments according to the fourth aspect of the present invention refers to a quality of communication in terms of efficiently exploiting resources. In an example, a case may be considered without the restriction where two indoor UEs are served by a single BS. Further, it may be assumed that multiple-access is achieved using OFDMA (orthogonal frequency division multiple access) as an LTE-advanced/pro standards. Under OFDMA disjoint subsets of sub-carriers are allocated to the UEs. Furthermore, it may be considered a SUDAS where each UE is served individually using multiple-access techniques such as FDMA (frequency divisional multiple access) or TDMA (time divisional multiple access) from the URUs. In such a case, URUs generate a unique relaying signal for both the UEs taking into consideration the achievable range on the URU-UE lengths. However, in the schemes described in [1], [2] and [3], each unique relaying signal consists of all subcarriers transmitted by the BS, resulting in a wastage of resources as the UEs are interested only in the subcarriers allocated to them. Therefore, according to the fourth aspect, URUs generate the relaying signals so as to take into consideration the multiple-access allocations of subcarriers to the UEs in the BS transmit signal.

A fifth technical challenge addressed by embodiments according to the fifth aspect of the present invention is based on a consideration of a SUDAS system where the URU serve multiple UEs located at different distances from it. Due to the difference in distance, the path-loss component of the channel varies and so does the achievable rate on the URU-UE link. It is known from [2] that compress-and-forward relaying can outperform AF relying and, at the same time, operate with fewer URUs connected to the UE. However, in case of CF, signals are encoded on the per-UE basis due to the variation in achievable rates. This is, for example, tolerable as long as the number of UEs is low. However, in case of a deployment in scenarios such as an airport or a train station or a football stadium, the number of connected UEs may be large. This imposes high computational complexity at the URUs as they have to generate many per-UE encoded signals. Therefore, an aim is to control this complexity at the URUs by reducing the number of encoded signals used and using broadcasting to reach multiple UEs.

In connection with a solution for outdoor-to-indoor applications, in particular amplify-and-forward SUDAS with independent relay processing a plurality of embodiments are described in the following. For the compress-and-forward scheme, well known solutions are described in [2].

Solutions for solving the above-described technical challenges are defined in presented embodiments. Embodiments in connection with the first technical challenge relate to resource allocation for a downlink multicarrier outdoor-to-indoor transmission system employing Shared User Equipment (UE)-side Distributed Antenna System (SUDAS) with independently operating amplify-and-forward (AF) relays which utilize both licensed and unlicensed frequency band to enhance indoor data throughput and coverage. Firstly, a non-convex matrix-valued resource allocation problem for maximization of the sum rate is formulated. Embodiments relate to solve an indoor problem and an outdoor problem whilst considering an optimization problem as described, for example, in connection with FIG. 7. Subsequently, the non-convex problem is simplified to a scalar optimization problem using a practically motivated approximation to obtain a low-complexity method using Alternating Optimization (AO). Simulation results illustrate that despite the simplification, the proposed concept achieves excellent performance in terms of the sum rate and closely approaches the max-flow min-cut upper bound. The proposed SUDAS scheme facilitates low-complexity outdoor-to-indoor communication for next generation wireless systems.

Notation: In the following, boldface capital letter, A, and lower case letter, a are used to denote matrices and vectors, respectively. $A^*A^H$, det(A), Tr(A), and Rank(A) represent the conjugate, Hermitian transpose, determinant, trace, and rank of matrix A, respectively; $A \geq 0$ indicates that A is a positive semidefinite matrix; $I_N$ is the N×N identity matrix; $\mathbb{C}^{N \times M}$ denotes the set of all N×M matrices with complex entries; $H^N$ denotes the set of all N×N Hermitian matrices; diag($x_1$, $x_K$) denotes a diagonal matrix with the diagonal elements given by $\{x_1, x_K\}$; the; the Circularly Symmetric Complex Gaussian (CSCG) distribution with mean $\mu$ and covariance matrix $\Sigma$ is denoted by $CN(\mu, \Sigma)$; stands for "distributed as"; $[x]^+$ returns 0 when $x<0$ and returns x if $x \geq 0$; represents element-by-element multiplication (Hadamard multiplication) of two matrices; and $\varepsilon\{\cdot\}$ denotes statistical expectation.

System Model

In this section, the SUDAS system and signal models are introduced.

A. SUDAS Downlink System Model

Figure 4:
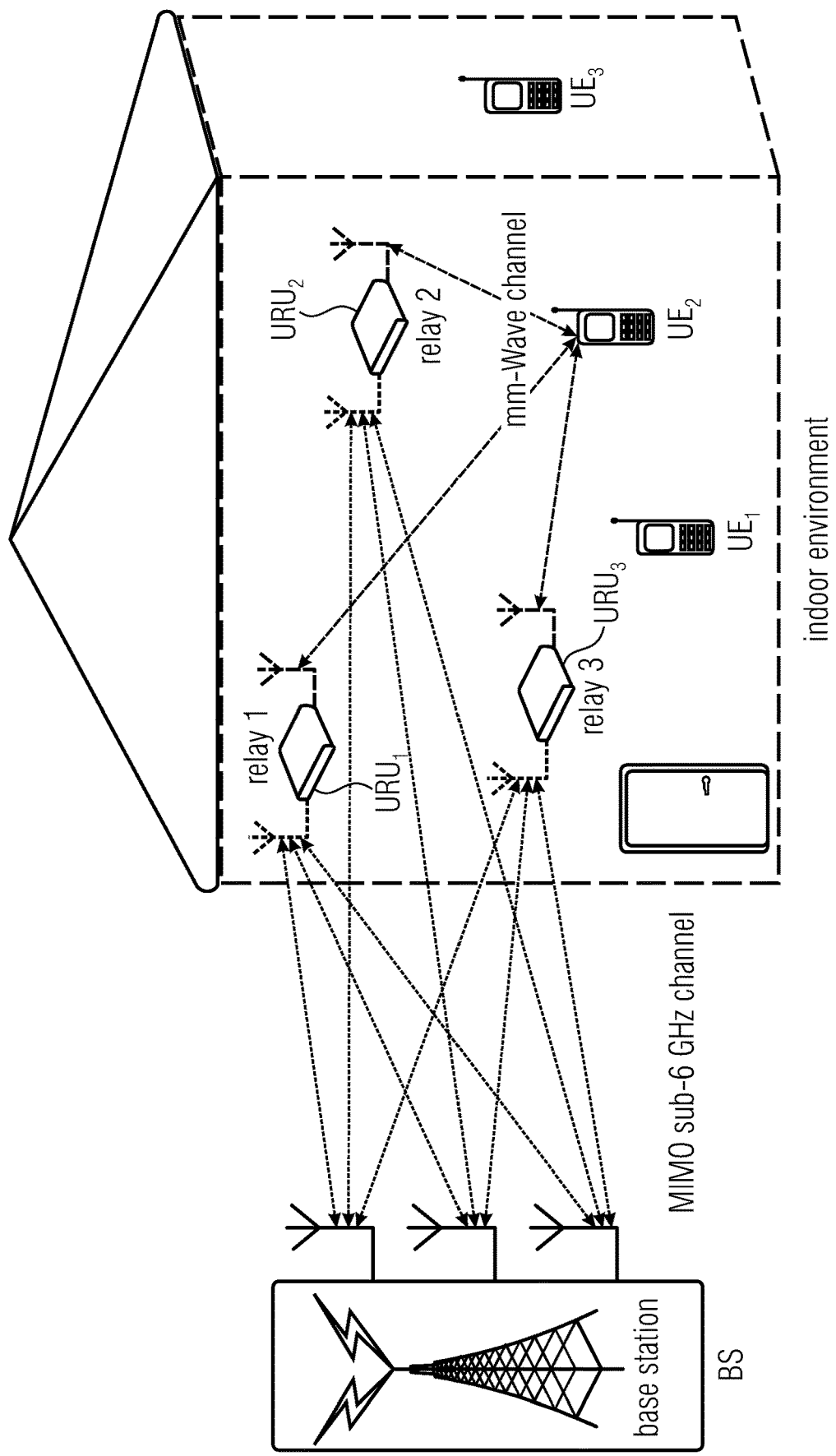
FIG. 4 shows a SUDAS assisted multi-carrier downlink transmission network in accordance with embodiments which may comprise an outdoor BS, a set of independently operating indoor AF relays, and indoor UEs.

A SUDAS assisted multi-carrier downlink transmission network which may comprise an outdoor BS equipped with N antennas, a set of M independently operating indoor AF relays, and K indoor UEs as depicted in FIG. 4. Each relay may be equipped with two antennas, one in the licensed band and one in the unlicensed frequency band, respectively. The BS utilizes, for example, orthogonal frequency division multiple access (OFDMA) downlink transmission with NF subcarriers operating in the sub-6 GHz licensed band. The relays receive, for example, the sub-6 GHz MIMO signal from the BS, perform amplification and frequency translation, and transmit the resulting signal in the unlicensed band to the UEs. Interference between different relay-UE links is avoided by using orthogonal mm-Wave frequency sub-bands for each link, resulting in Frequency Division Multiple Access (FDMA) in the mm-Wave band.

A given UE may receive M signals from the M relays in M different mm-Wave frequency sub-bands, and processes them jointly in order to recover the MIMO signal transmitted by the BS.

B. SUDAS Downlink Signal Model

The BS performs spatial multiplexing in the licensed frequency band. A data symbol vector $d^{[i,k]} \in \mathbb{C}^{N_s \times 1}$ is precoded on subcarrier $i \in \{1, \ldots, NF\}$ for UE $k \in \{1, \ldots, K\}$ at the BS as $$x^{[i,k]} = P^{[i,k]}d^{[i,k]}, \quad (1)$$

where $P^{[i,k]} \mathbb{C}^{N \times N_s}$ is a precoding matrix adopted by the BS on subcarrier i for UE k. $N_F$ is the number of subcarriers, and NS denotes the number of data streams. It is assumed that each subcarrier is allocated to a single UE. The signals received on subcarrier i at the M relays for UE k, are collected in a vector $y_S^{[i,k]} = [y_{S_1}^{[i,k]}, \ldots, y_{S_M}^{[i,k]}]^T$, $y_{S_m}^{[i,k]}$, where $y_{S_m}^{[i,k]}$ represents the signal received at relay $m \in \{1, \ldots, M\}$.

$y_S^{[i,k]}$ is given by $$y_S^{[i,k]} = H_{B \to S}^{[i]} x^{[i,k]} + z^{[i]},$$

where $H_{B \to S}^{[i]}$ is the M×N MIMO channel matrix between the BS and the M relays on subcarrier i, and $z^{[i]}$ $z_\Pi^{[i]}$ is the additive white Gaussian noise (AWGN) vector with distribution $CN(0, I_M)$.

Figure 5:
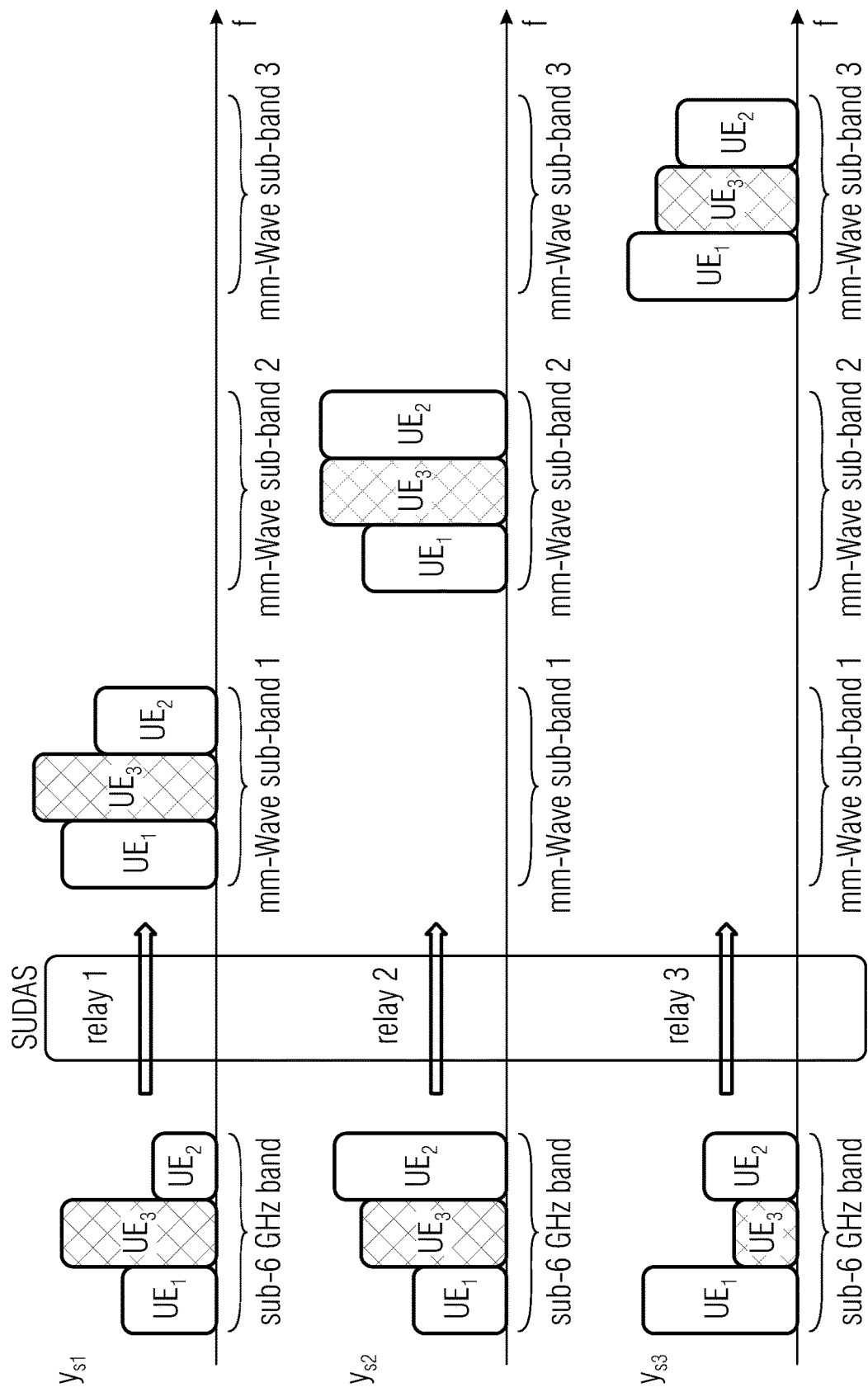
FIG. 5 shows forwarding the processed signal vector to a UE on a subcarrier in different and independent frequency sub-bands in the unlicensed spectrum according to an embodiment.

Each relay may perform amplification and frequency translation through which its received signal in the sub-6 GHz band is shifted to a mm-Wave frequency sub-band. Specifically, the M relays multiply the received signal vector on subcarrier i, $Y_S^{[i,k]}$, by a diagonal amplification matrix $F^{[i,k]} \mathbb{C}^{M \times M}$ and forward the processed signal vector to UE k on subcarrier i in M different and independent frequency sub-bands in the unlicensed spectrum as illustrated in FIG. 5.

The signal received by UE k on subcarrier i from the M relays, $y_{UE}^{[i,k]} \in \mathbb{C}^{M \times 1}$ can be expressed as $$y_{UE}^{[i,k]} = H_{S \to UE}^{[i,k]} F^{[i,k]} y_S^{[i,k]} + n^{[i,k]} \quad (3)$$

$$= \underbrace{H_{S \to UE}^{[i,k]} F^{[i,k]} H_{B \to S}^{[i]} x^{[i,k]}}_{\text{desired signal}} + \underbrace{H_{S \to UE}^{[i,k]} F^{[i,k]} z^{[i]}}_{\text{amplified noise}} + n^{[i,k]}$$

where $H_{S \to UE}^{[i,k]}$ is an M×M diagonal matrix in which the diagonal elements $[H_{S \to UE}^{[i,k]}]_{mm}$, m=1, 2, ..., M represent the channel gains between the relay m and UE k on subcarrier i, and i, and $n^{[i,k]} \in \mathbb{C}^{M \times 1}$ is the AWGN vector distribution $CN(0, I_M)$. The signal model given in (3) is depicted schematically in FIG. 6.

III. Resource Allocation Problem

An example expression for the sum rate and a formulation of the resource allocation problem for maximization of the sum rate is provided in the following.

A. Sum Rate

The end-to-end downlink achievable data rate on subcarrier i between the BS and UE k via SUDAS is given by [12], [16]

$$R^{[i,k]} = \log_2 \det(I_M + \Gamma^{[i,k]}(\Gamma^{[i,k]})^H (\Theta^{[i,k]})^{-1})$$

where $$\Gamma^{[i,j]} = H_{S \to UE}^{[i,k]} F^{[i,k]} H_{B \to S}^{[i]} P^{[i,k]}$$

is the effective end-to-end channel matrix from the BS to UE k via the SUDAS on subcarrier I, and $$\Theta^{[i,k]} = (H_{S \to UE}^{[i,k]} F^{[i,k]})(H_{S \to UE}^{[i,k]} F^{[i,k]})^H + I_M,$$

is the corresponding effective noise covariance matrix.

Therefore, the end-to-end downlink sum rate may be formulated as $$R_{tot} = \sum_{k=1}^{K} \sum_{i=1}^{N_F} s^{[i,k]} R^{[i,k]}, \quad (5)$$

where $s[i,k] \in \{0,1\}$ is the Boolean subcarrier allocation indicator which specifies whether or not subcarrier i is allocated to UE k.

B. Problem Formulation

In order to obtain the optimal precoding matrices $P^{[i,k]}$ and $F^{[i,k]}$ and the optimal subcarrier allocation policy $s^{[i,k]}$ that maximize the sum rate, the following optimization problem may be solved $$\begin{array}{c} \underset{P^{[i,k]} \geq 0, s^{[i,k]}}{\text{maximize}} \quad R_{tot} \\ F^{[i,k]} \geq 0, \text{diagonal} \end{array}$$

subject to:

$$C1: \sum_{k=1}^{K} \sum_{i=1}^{N_F} Tr(P^{[i,k]}(P^{[i,k]})^H) \leq P_{BS}, \quad (6)$$

$$C2: \sum_{k=1}^{K} \sum_{i=1}^{N_F} Tr(F^{[i,k]}(H_{B \to S}^{[i]} P^{[i,k]}(P^{[i,k]})^H (H_{B \to S}^{[i]})^H +$$

-continued $$I_M)(F^{[i,k]})^H) \le MP_S,$$

C3: $\sum_{k=1}^{K} s^{[i,k]} \le 1 \forall i,$

C4: $s^{[i,k]} \in \{0, 1\} \forall i, k,$ where C1 and C2 specify the transmit power constraints at the BS and the M relays, respectively, ensuring maximum transmit powers of $P_{BS}$ and $M_{PS}$. The maximum transmit power constraint at the relays is a joint power constraint which allows flexibility, e.g. to handle temporary blockages causing high attenuation, while still meeting the maximum indoor system power limits. Constraints C3 and C4 are the subcarrier allocation constraints ensuring that each subcarrier is allocated to at most one UE. $P^{[i,k]}$ and $F^{[i,k]}$ are restricted to be positive semi-definite matrices in order to avoid negative transmission powers and $F^{[i,k]}$ is a diagonal matrix owing to the independent operation of SUDAS relays.

The optimization problem in (6) is non-convex due to the non-convexity of the objective function and constraint C2, and the presence of combinatorial constraints C3 and C4.

Furthermore, the optimization variables in (6) are matrix-valued. Hence, the complexity of finding an optimal solution is very high.

In connection with the first technical challenge, embodiments according to the first aspect will be described in the following.

Previously, there was described a method to handle optimized parameter selection in the presence of multiple non-cooperating BSs based on alternating optimization scheme. Such a method may also be performed for a single base station even if being of particular advantage in the presence of non-cooperative base stations.

Figure 6:
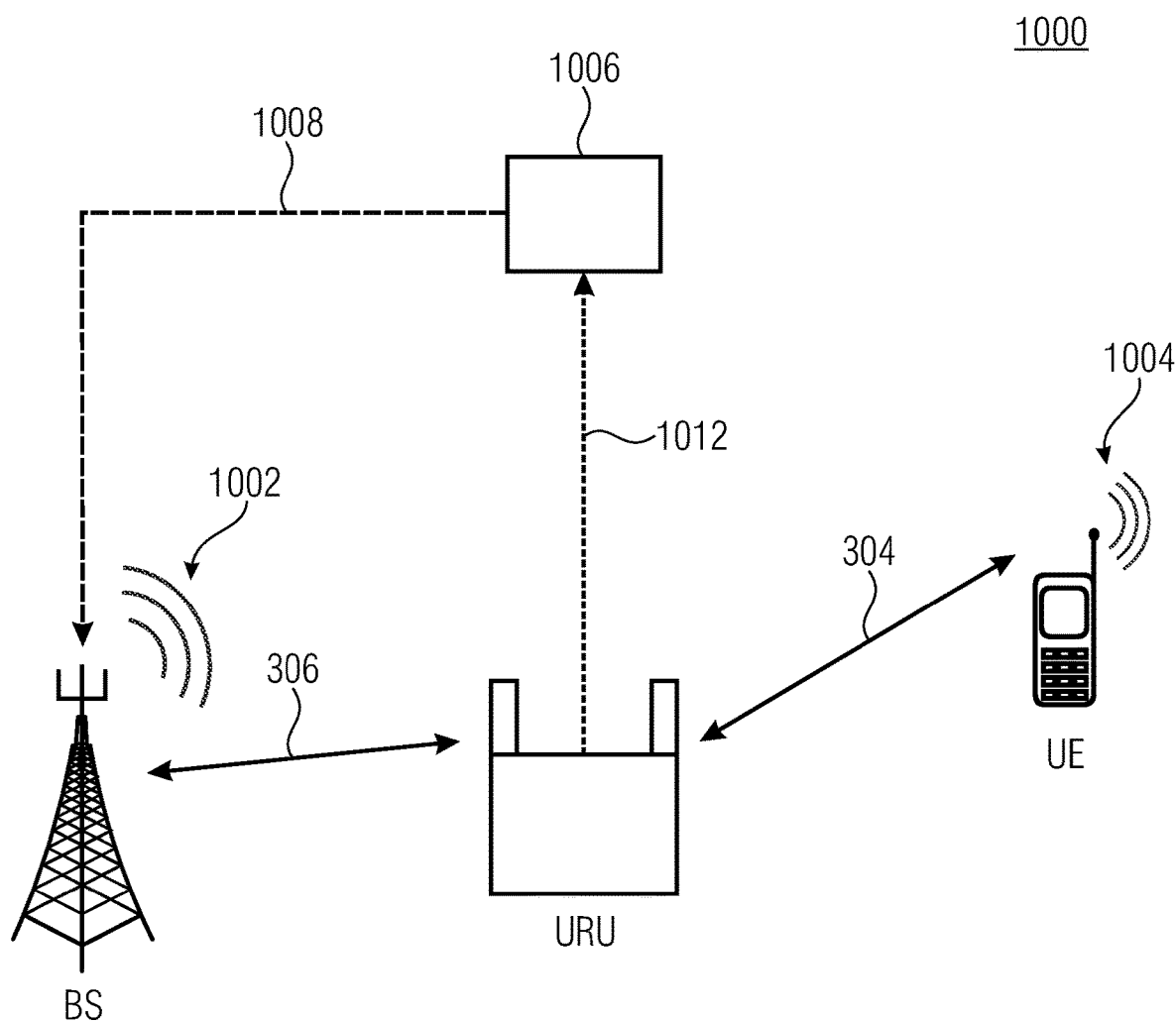
FIG. 6 shows a schematic block diagram of a SUDAS according to an embodiment of the first aspect.

FIG. 6 shows a schematic block diagram of a SUDAS 1000 according to the first aspect. The SUDAS 1000 comprises at least one URU being configured for relaying a signal between a base station BS and a UE. For example, a signal 1002 transmitted from the base station to the user equipment may be received by the URU via the backend link 306 and relayed, i.e., forwarded, to the UE using the frontend link 304. Alternatively or in addition, a signal 1004 may be relayed to the base station by transmitting the signal 1004 to the URU using the frontend link 304 and by transmitting the signal to be forwarded using the backend link 306. The URU may use different forwarding schemes such as AF, DF and/or Q/CF. Advantageously, the URU operates in the AF-mode.

Backend link 306 may be in a sub-6 GHz range, wherein the frontend links 3 and 4 may be in a higher frequency range such as a terahertz range, the millimeter wave or the visible light frequency range. Frequency ranges of the backend link 306 and the frontend link 304 may be disjoint with respect to each other, i.e., out of band with respect to each other.

The SUDAS 1000 comprises a controller 1006 configured for determining a first solution for a resource allocation in the frequency range of the frontend link 304. The determined resource allocation, i.e., the respective solution may be signaled to the base station BS using a respective signal 1008 which may be wireless or wired. The controller 1006 may also be referred to as SCON and may be dedicated component/entity or may be a distributed entity. The controller 1006 may be arranged completely or partially at the BS, the URU, the UE and/or a different location. For example, the controller 1006 being part of the URU may allow for transmitting the resource allocation of the frontend link 304 via the backend link 306. Alternatively or addition, the controller 1006 being at least partially implemented in the UE may allow for partially or completely transmitting the determined resource allocation via the frontend link 304 and the backend link 306 or a direct connection between the UE and the BS. Alternatively or in addition, the controller 1006 being arranged at least partially at the BS may allow for internally signaling the BS, the resource allocation of the frontend link 304. Alternatively or in addition, the controller 1006 being arranged at least partially at a different location may allow for use of a wired or wireless signaling in band or out of band with respect to the frontend link 304 and/or backend link 306 so as to communicate the signal 1008 to the BS.

The BS is configured for determining a solution for a resource allocation in the frequency range of the backend link 306 using the resource allocation, the respective solution, obtained with the signal 1008.

The indoor resource allocation may also be referred to as an indoor problem to be solved. To solve the indoor problem, a default set of parameters may be used, for example, for iteratively finding an optimal solution. For example, an initial value may comprise an equal power allocation of all URUs, i.e., in case more than one URU, initially the transmit power of each URU may be set to value $P_S$ as indicated in formula 6. Alternatively, a different predefined scheme may be used. Such an initial solution may be, for example, an objective function directed to the "weighted sum rate" and may be used as a generalization of the maximum sum rate across all UEs. The parameters may be selected such that the overall through put (sum of all rates to all UEs) is maximized subject to minimum rate guarantees at all users, i.e., some sort of fairness.

This transmit power may be mapped or correlated to parameters indicating the URU-UE communication. For example, a signal 1012 may be used to transmit the parameters for obtaining the predefined transmit power to the controller 1006 which uses the signal 1012 so as to obtain the signal 1008. Arranging the controller 1006 at least partially at the URU may allow to generate the signal 1008 and the signal 1012 as a common signal. The signal 1008 may thus comprise information indicating the resources allocated by the URU for maintaining the frontend link 304. In particular, in case of a plurality of URU and/or a plurality of UE but also in case of a plurality of BS different frontend links 304 and/or different backend links 306 may entail different resources. As a resource in connection present embodiments, one or more of a subcarrier, a transmission power, a code, a frequency and/or space may be implemented.

Figure 7:
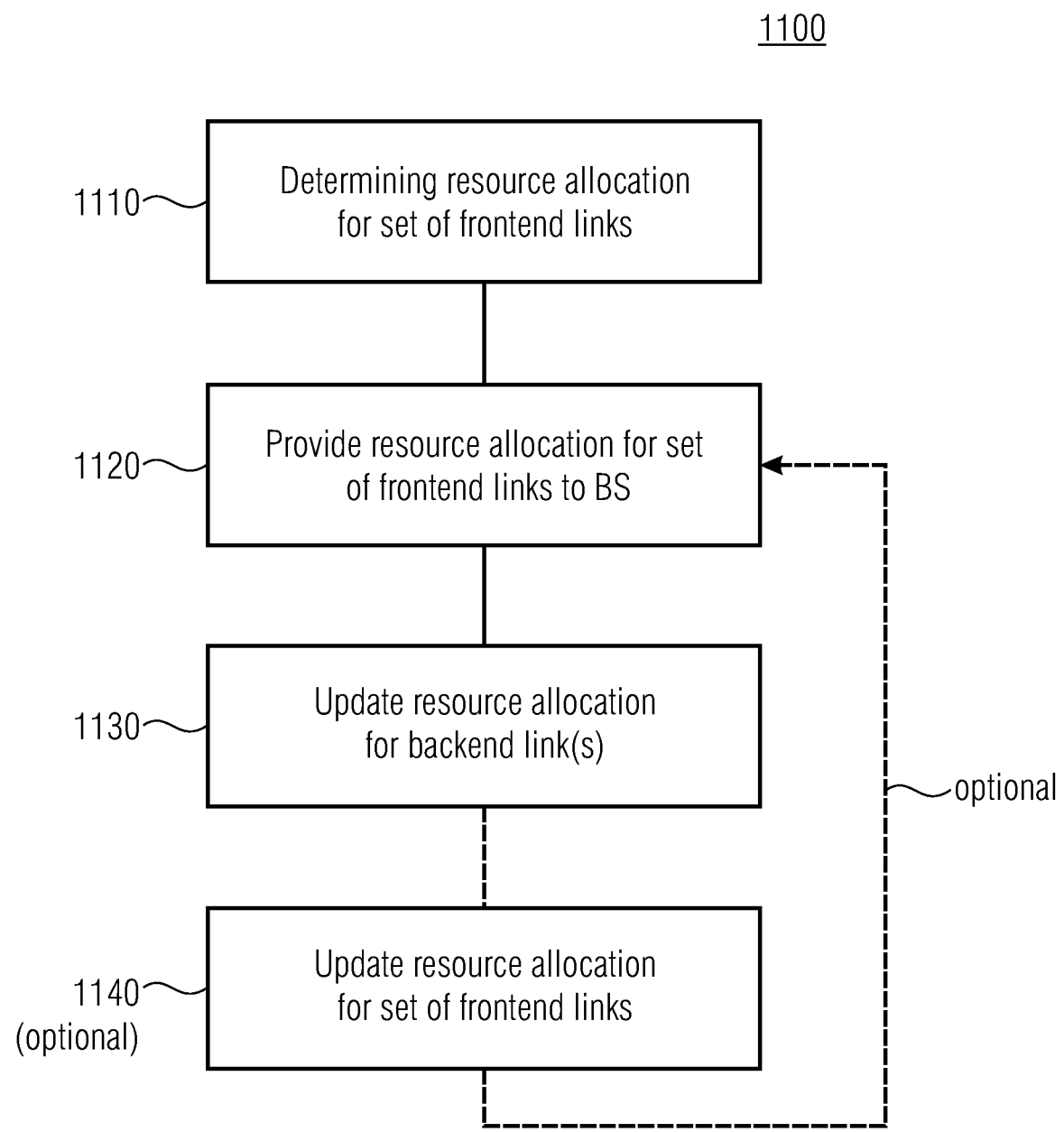
FIG. 7 shows a schematic flowchart of a method in accordance with an embodiment of the first aspect.

FIG. 7 shows a schematic flowchart of a method 1100 in accordance with the first aspect. A step 1110 comprises determining resource allocation for a set of frontend links. As described, this may refer to using an equal power distribution. In other words, the indoor problem is solved with a default set of parameters. Equal power may refer to a transmission power of each of the plurality of URU, antennas thereof and/or to an equal power of a plurality of antennas of the respective base station A step 1120 comprises providing the resource allocation for the set of frontend links, i.e., the indoor problem solution, to the base station. In other words, the solution parameters (or a parameter based on the relevant URU-UE parameters) are relayed from each URU to the associated BSs. A URU may be associated to more than one BS, for example, when communicating with more than one UE being associated with different BSs.

A step 1130 comprises updating the resource allocation for the backend link or the backend links. In other words, parameters or updated parameters are obtained for each BS-URU link. I.e., the second solution indicating a resource allocation in the backend links is determined based on the resource allocation for the frontend links.

Optionally, a step 1140 comprises updating the resource allocation for the set of frontend links, in other words, the indoor problem is updated. For example, an update may be performed based on the obtained BS-URU links. For example, having knowledge about the allocated resources in the backend, the URU may adapt its resource allocation in the frontend links.

Further, optionally, such an update may be executed iteratively, for example, until an optimization criteria such as a guaranteed minimum throughput of each UE, a maximum system throughput or the like is obtained.

The SUDAS such as the SUDAS 1000 may comprise a plurality of URUs. The controller 1006 may be configured for determining the first solution, i.e., the resource allocation in the frontend links, for each of the plurality of URUs individually as well as commonly so as to obtain a plurality of resource allocations for each URU. The one or more base stations may be configured for determining the resource allocation in the second solution, i.e., for the backend links, based on the plurality of resource allocations for the frontend links of the URU.

Further, the SUDAS 1000 may comprise a plurality of BS as described for the SUDAS 300. By way of example, the controller 1006 may be configured for controlling the SUDAS 300 so as to form a SUDAS. Each of the $URU_1$ to $URU_M$ may be configured for communicating with one or more of the base stations, for example, the base station within range, using an associated backend link 306. Each base station may be configured for determining a respective resource allocation for its maintained backend links. Thereby, different base stations and in particular non-cooperative base stations are informed about the frontend resource allocation and may therefore consider resource allocations in the frontend links dedicated to UEs that are unassociated with the respective base stations.

Each of the URUs $URU_1$ to $URU_M$ may be configured for communicating with at least one UE of the plurality of UEs $UE_1$ to $UE_K$ using an associated frontend link 304. Each of the URUs $URU_1$ to $URU_M$ may be configured for determining the resource allocation or respective parameters (first solution) based on a combination of the frontend links associated with the respective URUs. For example, $URU_3$ maintains 2 (or more) frontend communication links to $UE_1$ and $US_K$.

As indicated by the optional step 1140, the updated resource allocation for the backend link or the backend links obtained in step 1130, i.e., the first solution, may be used for communication in the SUDAS. This may include to keep step 1140 unexecuted. I.e., according to embodiments, the power allocation may remain unupdated. In such a case, in a simple scheme, equal power may be allocated, or, if the BS-URU CSI is available, which is a reasonable assumption, by assuming equal power allocation at the BS, i.e., that each of the N antennas at the BS are given power $P_B/n$, e, the total power $P_B$ is divided through the N antennas As an alternative, the controller 1006 may be configured for updating the first solution in the step 1040 so as to obtain an updated first solution and may use the results of step 1040, i.e., the second solution, for such as purpose. For example, a base station may decide to increase or decrease a transmission power for a respective backend link 306 in case of a relayed resource allocation of a URU.

The controller 1006 may be configured to use the updated resource allocation for the frontend link or a set of frontend links in a later iteration, for example, when executing step 1120, 1130 and/or 1140 for a at least a second time. A set of links in connection with embodiments described herein may be understood as a number of at least one link, for example, 1 or more, 2 or more, 4 or more, 5 or more, 10 or more, or even a higher number.

Based on iteratively executing steps 1120, 1130 and 1140, the controller may be configured for updating the resource allocation for the frontend links until a deviation between the updated indoor resource allocation and the resource allocation of a previous iteration is below or equal to a predefined threshold. The respective updated resource allocation (updated first solution) may then be used for communication in the network. The predefined threshold may be, for example, the value $\Delta$ in the described method for iterative resource allocation.

The controller 1006 may be configured for determining a power allocation in the frontend links as a part of the resource allocation in the frontend links and/or a power allocation in the backend links as part of a resource allocation in the backend links and/or an allocation of subcarriers used in the frontend links as a part of the resource allocation under the constraints given in formula 6.

As described, the controller may be configured for determining the resource allocation for the backend links based on Karush-Kuhn-Tucker conditions.

Embodiments of the first aspect also refer to a URU configured for operating in a SUDAS comprising at least the URU and possible further URUs. The URU is configured for relaying a signal between at least one base station and at least one user equipment by communicating with the at least one UE via a frontend link in a first frequency range and with the at least one base station in a second frequency range via a backend link. The URU comprises a controller, e.g., at least a part of the controller 1006, configured for determining the first solution for a resource allocation in the frontend communication links.

Further embodiments of the first aspect refer to a base station configured for operating in a SUDAS comprising at least one URU, wherein the at least one URU is configured for relaying a signal between the base station and at least one UE by communicating via the frontend link and the backend link. The base station comprises a controller, for example, at least a part of the controller 1006, configured for determining the resource allocation in the first frequency range and a resource allocation in the second frequency range. The controller is configured for controlling the at least one URU according to the determined resource allocation for the frontend links.

When compared to prior solutions according to which the existing algorithms as described in [1] to [6] that use a centralized unit to perform optimal parameters selection (i.e., resource allocation) for the SUDAS system and that are unable to offer a solution for multiple non-cooperating BSs, embodiments of the first aspect describe a concept to handled optimized parameter selection in the presence of multiple non-cooperating BSs based on an alternating optimization scheme. In a first scheme, SUDAS plays a central role in the parameter selection for all links working as arbitrary exchange parameter amongst the BSs for the BS-URU links. Under this scheme, the overall parameter selection is broken down into smaller parameter selection problems: one for all the URU-UE links (indoor problems: frontend links) and one for every BS-URU link (backend link; outdoor problem). An example is given in FIG. 7. As described previously, such a scheme quickly converges to the optimal parameters.

In connection with the indoor problem and the outdoor problem solved, reference is made to the optimization problem in equation (6). There are three variables to be optimized. First is the variable $s^{[i,k]}$, which indicates subcarrier allocation and which is unmentioned here for the sake of explanation. The possibly more important parameters that remain are matrix P which contains the precoding and power allocation for the basestation and matrix F which contains the precoding and power allocation for SUDAS. Two sub-problems (or reduced problems) can be obtained from (6) as follows: First fix matrix P to an initial value. With this change, the optimization problem (6) contains only one optimization variable F. This is known as the indoor problem since F only affects the SUDAS power allocations. Similarly, when the matrix F is fixed, problem (6) reduces to the outdoor problem as the optimisation variable P only affects the BS to URU links. Alternating optimization (AO) solves these problems as follows (according to FIG. 4). In the first step in FIG. 4, step 1110, the matrix P is fixed, and (6) is solved for F, i.e. solving the indoor problem. The solution to F is the indoor resource allocation. Next, F is fixed, and equation (6) is solved for P, the outdoor problem to obtain basestation resource allocation. This may correspond to step 1130. Once a new P is found, the indoor problem may again be solved for this new P instead of the originally assumed P. Solving the indoor problem a second time provides us new values of F which is called an update to the indoor resource allocation.

Within the first aspect it is also possible that the indoor parameters obtained in step 1110 are kept fixed. Therefore, step 1140 and the optional jump back to step 1120 may be unexecuted or unnecessary and the parameter selection may stop after step 1130. Alternatively or in addition, optionally, SUDAS may also solve the indoor problem and/or outdoor once again as indicated in FIG. 7.

The non-iterative scheme may work well in practice due to the high available bandwidth and rates at the URU-UE links.

In connection with the second technical challenge, embodiments according to the second aspect will be described in the following.

According to the second aspect and as derivable from [1], [2] and [3], for a resource allocation of high quality or even an optimal resource allocation, Channel State Information (CSI) from some or even all links may be used. In a practical case, the amount feedback may heavily degrade the efficiency of the overall communication system, for example, based on the high number of frontend links. According to the second aspect, due to the high available bandwidth and rates of the URU-UE links, a hybrid CSI may be generated from the CSI of the BS-URU links and the URU-UE links, i.e., of the backend links and the frontend links. Such a hybrid CSI may be sufficient to achieve an excellent practical performance. Hybrid CSI takes the place of conventional CSI, therefore, the amount of feedback may be the same as that of a conventional scheme. An example of a hybrid CSI is hybrid SNR, which considers the SNRs on a BS-URU corresponding UE link to generate a single SNR value for the end-to-end link. Such a SNR may be generated using the rate-distortion theory as explained above and may provide excellent practical performance.

Although hybrid CSI is described as being formed by one backend parameter characterizing a respective backend link and a by one frontend parameter characterizing a respective frontend link, according to embodiments, the hybrid parameter may be formed by more than one backend parameter and/or more than one frontend parameter. I.e., one but also a higher number of parameters may be used for characterization and/or may be transmitted. Alternatively or in addition, frontend and backend parameter(s) may describe same or different properties. I.e., the hybrid CSI or hybrid SNR may depend on multiple parameters of the indoor and/or the outdoor environment.

A CSI in connection with the embodiments described herein may be, for example, a signal-to-noise-ratio (SNR). Alternatively or in addition channel state information may comprise actual channel coefficients such as a channel impulse response, a service level such as CQI (Channel Quality Indicator) in LTE, a requested modulation-coding scheme which may be derived from other information such as the SNR or other suitable information. Some examples for hybrid CSI, hybrid SNR respectively include simple combinations such as a product or sum of the indoor and outdoor SNRs or CSIs. Or, they may be computed using advanced algorithms such as $$\max_k \psi(i,k)$$

per subcarrier i, as described in the text around Equation (21) in [2].

Hybrid CSI, for example, as hybrid SNR, may be signaled per spatial stream, i.e., per backend link and associated frontend link. Therefore, there may occur a difference in the signaled value when compared to an exactly mapped BS-URU-UE link. However, the hybrid CSI may represent the end-to-end CSI per spatial stream for the BS-UE link.

Figure 8:
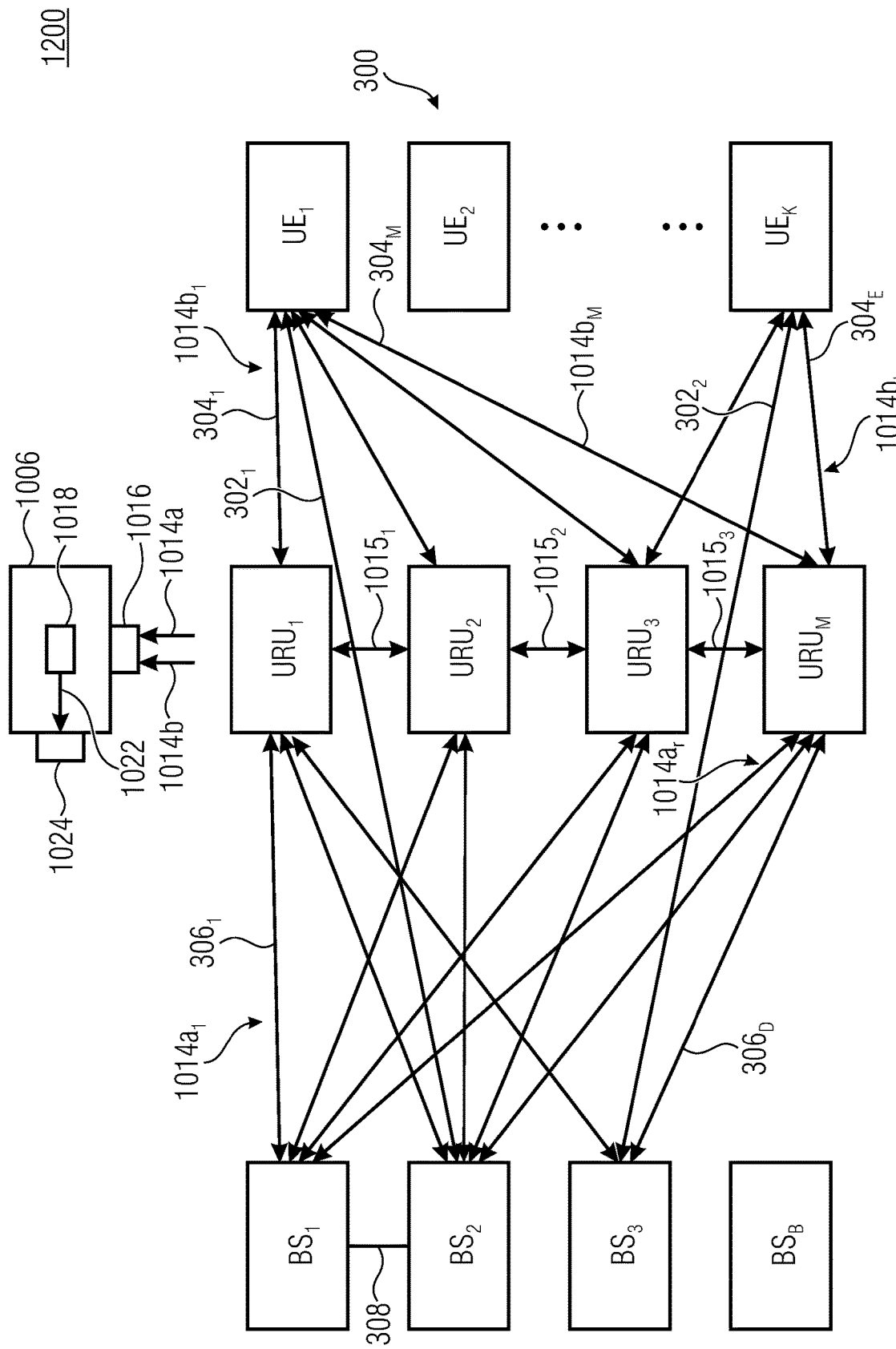
FIG. 8 shows a schematic block diagram of a SUDAS according to an embodiment of the first aspect, comprising the SUDAS of FIG. 3 and a controller.

FIG. 8 shows a schematic block diagram of a SUDAS 1200 comprising the SUDAS 300 and the controller 1006. A backend link such as the backend link $306_1$ may be characterized by a backend parameter $1014a_1$, e.g., a CSI for the backend link $306_1$. Further, a frontend parameter $1014b_1$ may characterize a frontend link such as the frontend link $304_1$, the frontend link and the backend link forming together one path of communication between a base station and a UE. The SUDAS 1000, e.g., the controller 1006, is configured for determining a hybrid parameter using the backend parameter $1014a_1$ and the frontend parameter $1014b_1$. The base station maintaining the respective backend link, e.g., the $BS_1$ may allocate resources for the backend link $306_1$ based on the hybrid parameter. As described, the hybrid parameter may describe a hybrid channel state information and may comprise at least one of a hybrid SNR, a hybrid channel coefficient, a hybrid service level and a hybrid modulation coding scheme and/or other parameters.

For example, the controller 1006 may signal the hybrid parameter to the respective base station. Such a signaling may be performed directly, as described for SUDAS 1000. According to an embodiment, the base station may substitute a known CSI for the backend link with the hybrid CSI and may allocate the resources for the respective backend link in absence of the backend parameter as a dedicated parameter. This allows for maintaining a network load whilst increasing the information contained thereby. The hybrid parameter thus not only does describe a quality of a channel between the base station and the URU but describes a quality of a channel between the base station and the UE via the URU. Allocating the resources may include, amongst other things or exclusively, a power allocation and/or an allocation of a sub-carriers.

For example, the controller being implemented at least partially in the UE, the UE may be configured to determine an end-to-end parameter such as a CSI for direct communication with a BS. When the UE communicates within a SUDAS, the UE may switch to an operation in which it reports a hybrid parameter as a combination of the indoor and outdoor channel parameters instead of the conventional CSI (e.g. SNR) of the outdoor links.

A controller according to this second aspect may be configured for controlling a SUDAS such as the SUDAS 1200. The controller may comprise an input interface 1016 for receiving information indicating a backend parameter such as the backend parameter 1014a and for receiving a frontend parameter such as the frontend parameter 1014b of some or all of the links.

The controller 1006 may comprise a determination unit or processors/ASIC/microcontroller 1018 for determining the hybrid parameter 1022 using the frontend parameter 1014b and the backend parameter 1014a. The controller 1006 may comprise an output interface 1024 for providing the hybrid parameter 1022. Both, the input interface 1016 and the output interface 1020 may each be built as a wired or wireless interface.

When compared to a wire-known method to reduce the CSI as described in [2] which is directed to CF relaying and which involves re-writing the parameter optimization problem at the centralized unit (controller) such that very less CSI feedback is used from the SUDAS for optimal parameters selection but which is very specific to CF (or DF) relaying and is not applicable directly to AF relaying, embodiments described herein provide a possibility for optimizing resource allocation at low network load for transmitting CSI information. Other known methods as described in [1] or [3] use CSI from all possible links at the centralized controller which is avoided with embodiments described herein.

In connection with the third technical challenge, embodiments according to the third aspect will be described in the following.

To address the third technical challenge, embodiments according to the third aspect are directed to the idea to only use a subset of all possible available URUs in the SUDAS for communicating with a specific UE: This allows to remain one or more URUs for said communication to the specific US unused so as to reduce interference and/or network load. For example, when a high quality communication or a highly reliable communication is ensured by only a subset of URUs used, the interference of the further URUs present in the SUDAS may be prevented. Alternatively or in addition, URUs that only have a poor or low quality link to the specific UE may remain unused so as to prevent their interference that is of low benefit for communication.

Embodiments of the third aspect describe a SCON which selects the subset of URUs used for communicating with a UE. This selection can be performed differently. For example, and related to the first technical challenge, the BS-URU-UE links are evaluated and are identified, tagged or enumerated in a specific order, for example, an increasing or descending order. For example, the links are enumerated in descending order based on a performance criterion such as a CSI, for example, the end-to-end hybrid SNR described in the second aspect. Other hybrid CSI are also suitable for such an evaluation. Next, the requisite or predefined number of URUs with the highest performance criterion or performance criterion indicating the highest link quality may be selected for communicating with the UE. The requisite number or predefined number may be calculated, for example, based on the MIMO parameters of the SUDAS. An example for such a parameter may be an LTE parameter known as rank indicator (RI) which indicates number of independent signal paths used to decode the MIMO signal. E.g., if RI=2, then 2 URUs are sufficient. A higher number of URUs may increase the performance but are not necessary.

Alternatively or in addition, embodiments may implement a construction of an optimization problem to maximize a performance criterion as described in equation (6), e.g., a total through put or a minimum energy as in [12]. This optimization problem may be solved, for example, at the controller, to obtain the optimal URU-UE links to be used. In both cases, the controller (SCON) selects a subset of URUs for a UE. The controller may be configured for determining the subset of URUs to be used for relaying the signal based on an optimization formulation maximizing a partial performance criterion related to a performance of links between the URU and the UE or between the base station and the UE via the URU. Optimization may be performed with regard to one or more criterions, amongst which there are (a) an overall throughput of the SUDAS, (b) satisfying a minimum rate requirements for the UEs under SUDAS and (c) minimizing a power requirement.

When referring again to FIG. 8, for example, the controller may be configured for controlling $URU_1$, $URU_2$ and $URU_3$ so as to communicate with $UE_1$ whilst controlling $URU_M$ so as to not relay a signal between $BS_1$ and/or $BS_2$ and $UE_1$. For example, based on a high distance between $URU_M$ and $UE_1$, the frontend link $304_M$ may be of poor quality as may be measured by the frontend parameter $1014b_M$ which may lead to an overall poor quality of the link between $BS_1$ and/or $BS_2$ to $UE_1$ via $URU_M$.

Figures 9, 10:
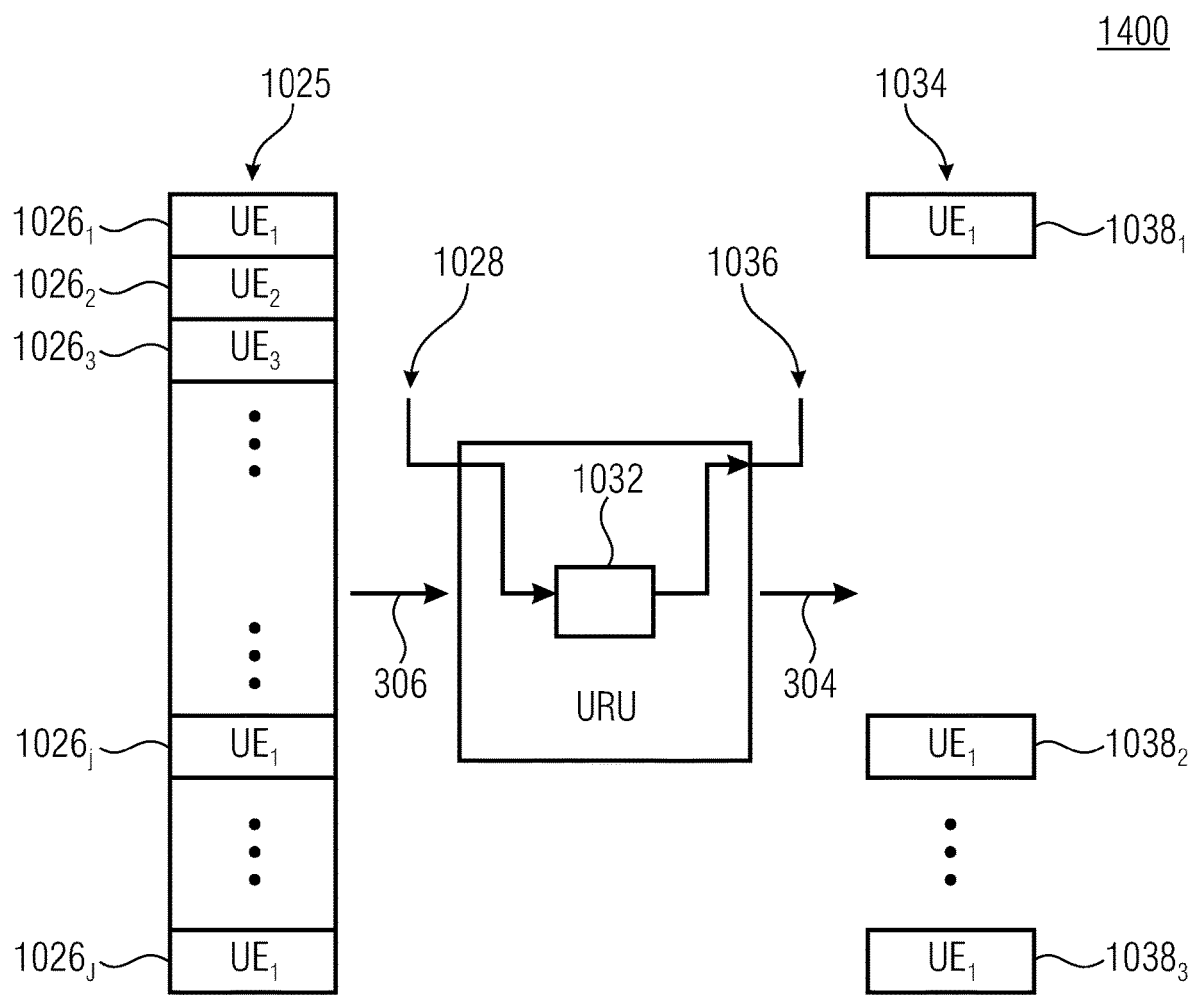
FIG. 9 shows a schematic illustration of a table that may be obtained at the controller according to an embodiment and which solves the link quality between a base station and a specific UE.
FIG. 10 shows a schematic block diagram of a URU in accordance with an embodiment of the fourth aspect.

FIG. 9 shows a schematic illustration of a table that may be obtained at the SCON and which solves the link quality between a base station such as $BS_1$ and a specific UE such as $UE_1$. The SCON may be configured for selecting at least one URU, e.g., $URU_1$, of the plurality of URUs for relaying the signal to be communicated between $BS_1$ and $UE_1$ and for controlling the selected $URU_1$ so as to relay the signal. The SCON such as the controller 1006 may further be configured for controlling an unselected URU such as $URU_M$ so as to not relaying the signal.

The controller may select, for example, a specific number having the best links to the UE. Alternatively or in addition, the controller may select those URUs and a possibly varying number of URUs that, in total, provide for a sufficient link quality. For example, such a combined quality parameter may be indicated by a threshold value. The controller may be configured for associating a quality parameter to each of the plurality of URUs, e.g., a hybrid CSI or a different value related to a performance criterion related to a performance of a link between the base station and the UE via the URU. The controller is configured for selecting a subset of URUs from the plurality of URUs for relaying the signal based on an evaluation of the quality parameter. Thereby, at least the URU comprising the highest performance of the link between the base station and the UE is within the selected subset. The controller may be configured for sorting the plurality of URUs based on the performance criterion, for determining a number of URUs to be selected from the plurality of URUs and for selecting the determined number from the sorted plurality of URUs.

When considering now a scenario in which at least a second UE is present in the network, for example, $UE_2, \ldots, UE_K$, the controller 1006 may perform the described selection for each of the UE. Thereby, a plurality of subsets that may have common URU and do not require to be disjoined, may be selected, at least one subset for each UE. The selection of the subsets may be coordinated such that, in total, an optimization criterion is obtained. For example, a total through put of the plurality of URUs may be an optimization criterion. For example, a URU may be decided to be used in a subset although it would have been omitted from the subset when only considering one single UE. Therefore, a URU that would have been selected based on the performance criteria but that is also selected by a variety of other subsets may remain unselected for the examined subset so as to reduce its load, interference or power consumption. Further, the URU being multiply selected may have limit through put being already used or even exceeded by a selection of other subsets. Therefore, the URU may be omitted from the selection and/or a different URU may be selected instead. Another optimization criterion may be a transmission energy used for relaying the signals between the base station and the plurality of UE. This may allow for combining the relation of the performance criteria and a consideration of an energy consumption in the whole network.

The controller 1006 may partially or completely be arranged at the base station, the URU and/or the UE. A respective entity may comprise an interface for receiving the used information relating to a plurality of URU configured for relaying a signal between the BS and the UE.

In connection with the fourth technical challenge, embodiments according to the fourth aspect will be described in the following.

The fourth technical challenge is addressed by embodiments according to the fourth aspect. An idea of the fourth aspect is to provide a URU that forwards only the requisite time-frequency resources to a UE. A possible operation thereof is as follows:

1) A URU obtains a signal from the BS with used UE allocations contained as control information. This is forwarded to the UE.

2) Next, the UE decodes this control information to extract the information about the allocated time-frequency resources. This information is relayed back to the URU.

3) For the duration of the validity of the control information, the URU constructs a relay signal wherein only the multiple-access resources allocated to the UE are forwarded to the UE. For example, in multiple-access using OFDMA (orthogonal frequency division multiple access), the URU decodes the control information to extract the subcarrier allocations to the UEs being served. Once this information is extracted, the URU relays to a UE the subcarriers allocated to it, using one of the relaying schemes such as AF, Q/CF or DF.

This allows preventing occupation of unrequired resources/subcarriers in particular in view of a possibly higher bandwidth at the frontend links when compared to the backend links.

FIG. 10 shows a schematic block diagram of a URU 1400 in accordance with an embodiment of the fourth aspect. The URU 1400 may be operated as a URU of the SUDAS 1200, for example. The URU is configured for receiving a signal 1025, for example, through the backend link 306. The signal 1025 uses a plurality of resources $1026_1$ to $1026_f$, wherein different resources are allocated to different UEs. For example, resources $1026_1$, $1026_j$ and $1026_f$ are allocated to $UE_1$ whilst other resources such as resources $1026_2$ and $1026_3$ are allocated to different UEs such as $UE_2$ and $UE_3$. The URU 1400 having knowledge about the resource allocation, at least for $UE_1$, comprises a wireless interface 1028 for receiving the signal from the base station. The URU 1400 comprises a signal generator 1032 configured for selecting a subset of resources from the plurality of resources contained in the signal 1025 and to provide an output signal to be transmitted via a respective wireless interface 1036 to the UE. The signal generator 1032 is configured for generating the signal 1034 so as to dismiss at least some, advantageously all of the resources contained in the signal 1025 being not allocated to $UE_1$. The signal 1034 may comprise resources 1038 being allocated to $UE_1$. The resources 1038 may correspond to the respective resources of the signal 1035, e.g., when using an AF-concept. In such a case, the resource $1038_1$ may correspond to the resource $1026_1$, the resource $1038_2$ may correspond to the resource $1026_j$ and the resource $1038_3$ may correspond to the resource $1026_f$.

Although the resources $1038_1$, $1038_2$ and $1038_3$ are illustrated as being separated in the dimension of the resource, the signal generator 1032 may be configured for re-organizing the resources $1038_1$ to $1038_3$. The signal 1034 may be generated by the signal generator 1032 in absence of unselected resource, i.e., of a resource unallocated to the UE to which the URU 1400 communicates. In case of a plurality of UEs communicating with the URU 1400, the signal 1034 may be generated so as to comprise the resources allocated to the UEs to which the URU communicate whilst not comprising the resources allocated to other UEs. Thereby, unselected parts of the input signal 1025 may be discarded. The respective selection information indicating the resources allocated to the UE out of the resource available at the base station may be provided by any entity, advantageously by the controller 1006 or the UE. Thus, the information about the allocated time-frequency resources may be referred to as selection information.

Prior to providing the signal 1033, the URU 1400 may be configured for receiving further, prior to receiving the selection information, the URU may be configured for receiving an allocation signal containing information indicating resources available at the BS and allocated to the UE from the base station. The URU 1400 may be configured for forwarding or relaying the allocation signal to the UE.

The selection information indicating the resources 1026 to be forwarded to the UE may be discarded after a time elapsed since reception of the selection information or may be updated, for example, by receiving a further selection information. The selection information may thus be kept active or valid until a further information indicating the invalidity is received from the base station or the UE.

A UE according to an embodiment, for example $UE_1$ may be configured for receiving an allocation signal containing information indicating resources available at a base station to which the UE is associated and which are allocated to the UE. The UE may be configured for transmitting, to a URU, selection information indicating the allocated resources so as to enable the URU to generate the signals to be relayed to the UE according to the allocated resources.

By way of example, the signal 1025 may utilize a high number of resources, possibly exceeding the number of 100. At the same time, a specific UE may be allocated with a clearly smaller number of resources, for example, less than 50, less than 10, e.g. 5. Thereby, by not relaying the unallocated resources, significant amount of interference, power consumption and the like may be saved.

In connection with the fifth technical challenge, embodiments according to the fifth aspect will be described in the following.

To address the fifth technical challenge, embodiments according to the fifth aspect are based on the idea to provide for a URU which uses superposition coding to target multiple UEs at once. As an example, the scheme for a QF relay implementation using power levels superposition coding (as used in non-orthogonal-multiple-access: NOMA) to target multiple UEs. Beginning at a URU with a set of R of achievable rates on the frontend links such as the frontend links 304 in FIG. 8, one for each UE being served by the URU. The achievable rate is an expression used in the field to mean that when transmitting at this rate, the transmitter-receiver communication can be theoretically successful. At rates above this, error free communication is not always guaranteed. In case the set of UEs is too large to be monitored, a set of predefined code rates are used on a "best-effort" basis, e.g., R={r1, r2, r3, r4} bits per channel used with r1<r2<r3<r4. The number of four different rates is an example only and may be any different number exceeding 1, i.e., 2 or more, 3 or more, 4 or more, 5 or more or even a higher number such as 10 or more.

Next, a received signal at a URU may be coded as follows:
1) Let rN denote the highest rate in r, e.g., r4. First, the received signal may be mapped to a code rate of rN, e.g., using a lossy mapping. The rate restriction appears as adding quantization noise to the received signal;
2) Next, the code rate rN may be partitioned to codes p1, p2, . . . with code rates R'={r1, r2−r1, r3−r2−r1, . . . } of the partitions, so that the partitions are incremental. I.e., by receiving all the partitions, the signal encoded with rate rN can be recovered. This process may be referred to as rate splitting; however, in this case it contains incremental information instead of unique information in every split.
3) Next, the codes with the rates R' are superpositioned codes, for example, using power domain NOMA or using multi-level codes.
4) The resulting superposition codes are transmitted to all of the UEs communicating with the URU.

At the UE, the following functionality may be implemented:
1) Depending on the distance to the URU and the channel conditions, a UE may be able to decode the signal rate of, for example, rK. Therefore, it decodes the partitions p1, p2, . . . , until a combined rate rK is obtained beyond which decoding is not possible in the present example.
2) Next, it combines the partitions to obtain the received signal with quantization noise.

The received signal is lossy, i.e., it contains quantization noise due to the rate limitation to rK.
3) The UE uses the lossy version of the received signal to perform MIMO decoding.

Therefore, all UEs are served, depending on their channel conditions, with a single superposition code from a URU.

When compared to [1] which considers reading all received subcariers to all UEs in a AF relaying scheme, the fourth aspect allows for having high quality communication based on saving resources.

Embodiments of the fifth aspect are of advantage, e.g., in scenarios of broadcasting a signal in which a plurality of UEs receive a same signal.

Figure 11:
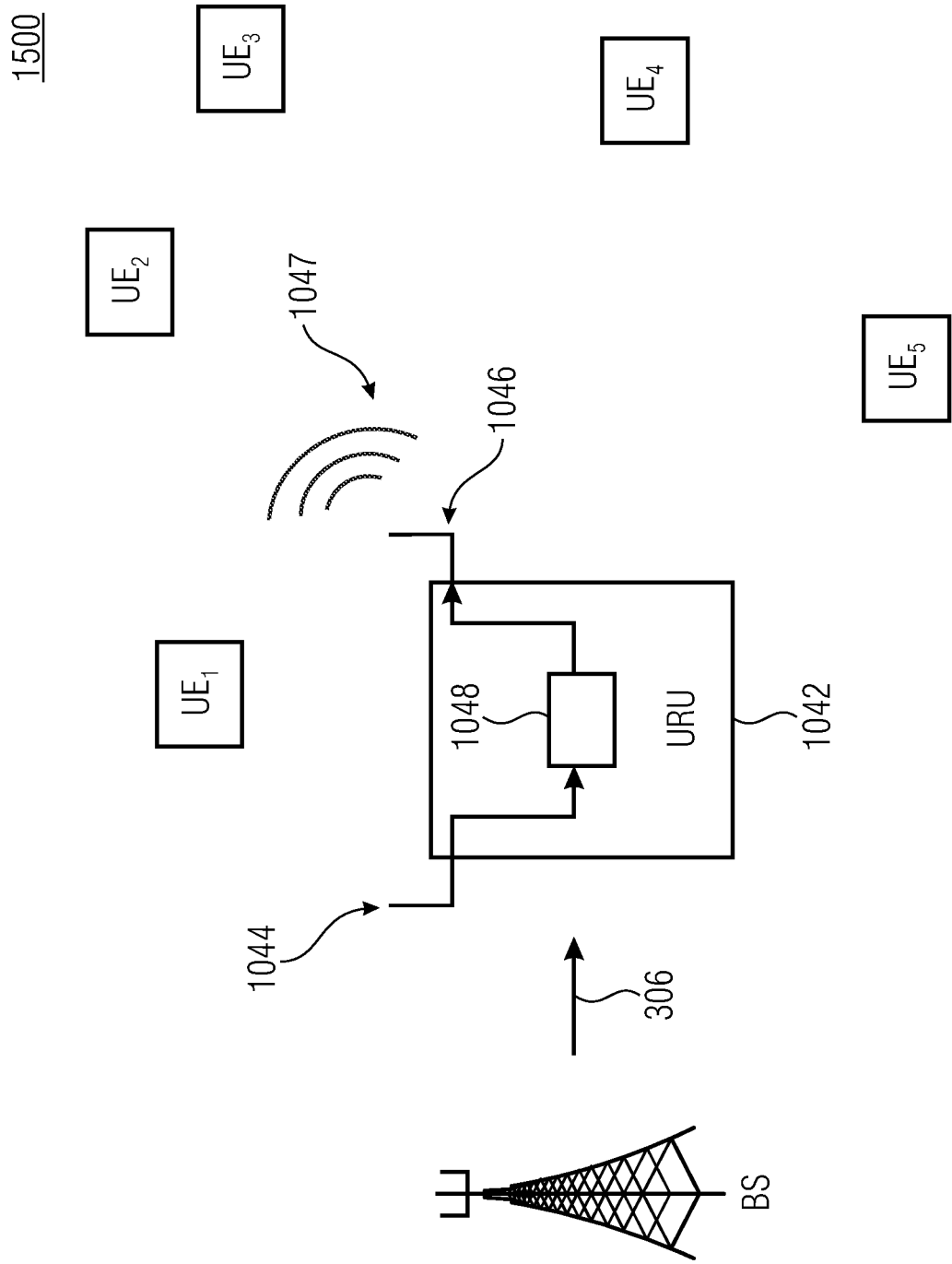
FIG. 11 shows a schematic block diagram of a SUDAS comprising the base station and a URU configured for relaying a signal received through the backend link.

FIG. 11 shows a schematic block diagram of a SUDAS 1500 comprising the base station and a URU 1042 configured for relaying a signal received through the backend link 306. The URU 1042 comprises a wireless interface 1044 for receiving the signal from the base station and a wireless interface 1046 for transmitting the relayed signal. The URU 1042 further comprises a signal generator 1048 configured to incrementally coding the payload data so as to obtain a plurality of incremental payload partitions and for providing an output signal 1047 by coding the plurality of incremental payload partitions. The signal may be transmitted with the interface 1046. The incremental payload partitions may be the partitions $r_i$ or R' as previously described. A number of UEs may be, for example, five but may also be any other number of zero or more. In particular, in a broadcast scenario, the URU may broadcast the output signal 1047 irrespective of the number of UEs present in the SUDAS. The signal generator 1048 may be configured for providing the output signal 1047 do as to use a plurality of resources for transmitting the output signal 1047. The signal generator 1048 may be configured for providing the output signal 1047 so as to utilize at least one resource of the plurality of resources for each incremental payload partition of the plurality of payload partitions. At least a first resource utilized for a first incremental payload partition of the plurality of incremental code partitions and a second resource utilized for a second incremental payload partition of the plurality of incremental payload partitions are non-orthogonal with respect to each other so as to allow for a simultaneous reception.

The signal generator 1048 may be configured for incrementally coding the payload data based on a varying code rate r1, . . . , r4, used for coding the plurality of payload partitions such that a combination of an increasing number of payload partitions corresponds to the payload data being coded with an increasing code rate. I.e., the code partitions are superpositioned.

The code rates may be time-variant, i.e., they may be adapted. For example, the code rates may be adapted based on the capabilities or link qualities of the UEs. The signal generator 1048 may be configured for obtaining information indicating a signal quality of links between the URU and one or more UE. The signal generator 1048 may be configured for using an associated code rate for coding the payload data so as to obtain the plurality of incremental payload partitions. The signal generator 1048 may be configured for adapting at least one of the associated code rates based on the information indicating the signal quality.

Alternatively or in addition, a granularity of the code partitions may be kept constant but may also vary. A variation of the granularity may be based, for example, on a number of UEs in the SUDAS, i.e., network. For example, a granularity may be increased with an increasing number of UEs so as to consider different needs of the UEs. The signal generator 1048 may be configured for obtaining information indicating a number of UE receiving the output signal 1047. The signal generator 1048 may further be configured for obtaining different payload partitions for using different code rates for a different UE and to adapt a number of incremental code partitions used for obtaining the plurality of incremental payload partitions based on the number of UE.

For example, the signal generator 1048 may be configured to adapt a number of incremental code partitions so as to correspond to the number of UE. Alternatively or in addition, the signal generator 1048 may be configured for evaluating the number of UE and to adapt the number of the incremental code partitions so as to correspond to the number of UE while the number of UE is at most a UE threshold value or smaller than the UE threshold value. I.e., the number of UE exceeding a maximum value may be handled so as to maintain a maximum number of code partitions. Alternatively or in addition, for a number of UE exceeding the UE threshold value, the signal generator 1048 may be configured for grouping the plurality of UE into a number of groups of UE such that the number of groups is at most the UE threshold value or smaller than the UE threshold value and to adapt the number of incremental code partitions so as to correspond to the number of groups of UE. This allows keeping the computational effort for coding within tolerable limits.

The signal generator 1048 may be configured for grouping the UE based on a link quality of a link between the respective UE and the URU such that similar link qualities are grouped together. For example, an overall error minimization may be used for determining the groups and the code partitions.

The signal generator 1048 may be configured for providing the output signal 1047 by executing a superposition coding on the plurality of incremental payload partitions.

For incrementally coding the payload data, the signal generator 1048 may be configured for mapping, e.g., lossy mapping, the payload data to a code having a first code rate and for rate splitting the first code rate so as to obtain a plurality of incremental code rates.

One or more of the $UE_1$ to $UE_5$ of SUDAS 1500 may be implemented according to a further embodiment of the fifth aspect.

Figure 12:
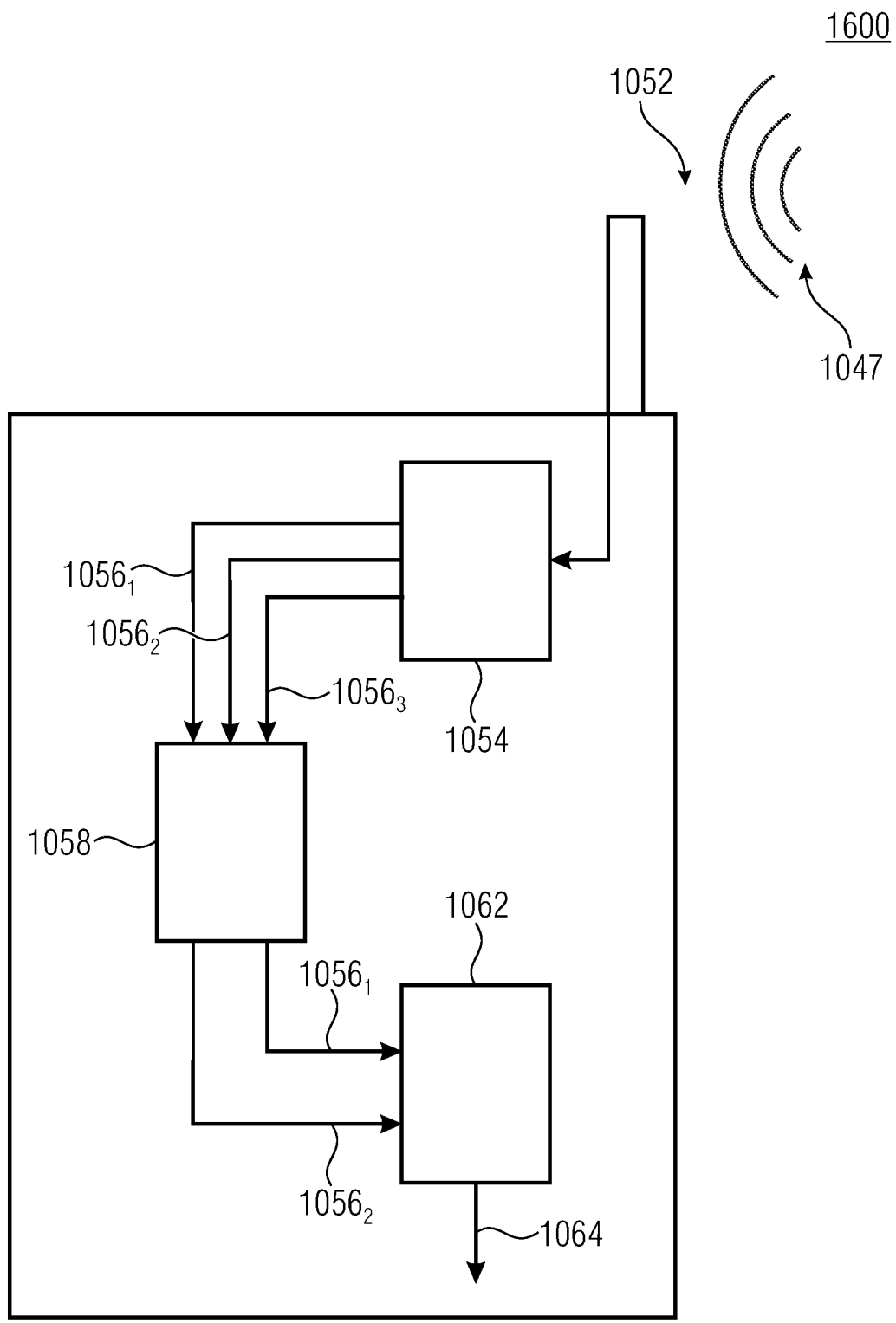
FIG. 12 shows a schematic block diagram of a UE according to an embodiment of the fifth aspect.

FIG. 12 shows a schematic block diagram of a UE 1600 according to an embodiment of the fifth aspect. The UE comprises a wireless interface 1052 for receiving a signal from a URU, in particular the URU 1042. I.e., the UE 1600 may receive the signal 1047. The UE comprises a decoder 1054 for decoding the signal 1047 so as to obtain decoded code partitions $1056_1$ to $1056_3$, wherein a number of decoded code partitions may correspond, for example, to a number of code partitions used for encoding the signal 1047.

The UE 1600 may comprise an evaluator 1058 for evaluating, if the decoded code partitions 1056 have been decoded successfully or unsuccessfully. The UE further comprises a combiner 1062 for combining payload partitions $1056_1$ and $1056_2$ being decoded successfully so as to obtain decoded payload data 1064 based on the successfully decoded combined payload partitions. For example, code partitions $1056_1$ and $1056_2$ have been decoded successfully while code partition $1056_3$ has been decoded unsuccessfully, i.e., error-prone. Based thereon, the evaluator 1058 may dismiss the code partition $1056_3$. The evaluator 1058 may forward the successfully decoded code partitions $1056_1$ and $1056_2$ to the combiner 1062. Alternatively, the combiner 1062 may receive the code partitions from another entity such as the decoder 1054 and may receive additional information from the evaluator such that the combiner 1062 may decide which decoded code partitions to use for generating the decoded payload data 1064.

When referring again to SUDAS 1500, different UEs being implemented according to UE 1600 may be configured for successfully decoding the payload data of the signal 1047 with different code rates so as to comprise a different amount of losses in the respective decoded payload data 1064.

When compared to [2] in which encoding signals are considered on a per-UE basis in the downlink, this may allow serving a high number of UEs and therefore a high quality communication.

Aspects of the present invention relate to concepts for digital wireless broadband communications and, in particular, concepts for digital wireless broadband communications suited for base stations with multiple antennas. Wireless broadband communications have to maximize the spectral efficiency, i.e., the data rate that can be transmitted per Hz of the occupied spectrum, in downlink and uplink. This is motivated by the fact that the available spectrum is a scare resource and cannot be extended further. Modern wireless communications standards like LTE and 5G have therefore increased their spectral efficiency primarily by using multiple antennas at transmitters and receivers, which allows the use of multiple parallel datastreams or layers. When the transmitter or receiver is a UE, the potential number of antennas is limited by the small size of the device. The spectral efficiency of a UE is especially reduced in scenarios, where the UE is located inside a building or a vehicle, which attenuates the signals from an external base station. Moreover, when a user is in the same (e.g., conference) room or vehicle (e.g., a train, a bus or the like) as many other users, the UE has to share the overall spectrum with further users and the data rate drops further. The described invention introduces relays as a kind of auxiliary antennas for all UEs in the same room or vehicles. These relays can be built firmly into the building or vehicle, e.g., into the roof, the window frames, electrical switches, electrical outlets or the like, or they can be integrated in removable elements like lamps, delicate plugs for the electrical outlets, battery-driven devices that can be attached to a window on-the-fly, or into any electrical device like TV or radio sets, smart home appliances, etc.

Although aspects 1, 2, 3, 4 and 5 have been described in view of different embodiments, each of the aspects described above may be combined with one or more of different aspects without any limitation.

In the following, additional embodiments and aspects of the invention will be described which can be used individually or in combination with any of the features and functionalities and details described herein.

In accordance with a first aspect, a SUDAS, comprising at least one URU, wherein the at least one URU is configured for relaying a signal between at least one base station (BS) and at least one User Equipment (UE) by communicating with the at least one UE in a first frequency range and with the at least one BS in a second frequency range, may have: a controller 1006 configured for determining a first solution for a resource allocation in the first frequency range; wherein the base station is configured for determining a second solution for a resource allocation in the second frequency range using the first solution.

In accordance with a second aspect when referring back to the first aspect, the SUDAS may comprise a plurality of URUs ($URU_1$-$URU_M$), wherein the controller 1006 is configured for determining a first solution for each of the plurality of URU so as to obtain a plurality of first solutions, wherein the base station is configured for determining the second solution based on the plurality of first solutions.

In accordance with a third aspect when referring back to the second aspect, the SUDAS may further comprise a plurality of BS, wherein each of the URU is configured for communicating with each of the BS using an associated backend link in the second frequency range, wherein each BS is configured for determining a second solution for each backend link associated with the BS.

In accordance with a fourth aspect when referring back to the second or third aspect, the plurality of BS may be non-cooperative.

In accordance with a fifth aspect when referring back to the third or fourth aspect, the SUDAS may further comprise a plurality of UE, wherein each URU is configured for communicating with at least one UE of the plurality of UE using an associated frontend link 304 in the first frequency range, wherein each of the plurality of URU is configured for determining the first solution based on a combination of the frontend links 304 associated with the URU.

In accordance with a sixth aspect when referring back to any of the first to fifth aspects, the first solution may be used for communication.

In accordance with a seventh aspect when referring back to any of the first to fifth aspects, the controller 1006 may be configured for updating the first solution so as to obtain an updated first solution using the second solution.

In accordance with an eighth aspect when referring back to the seventh aspect, the controller 1006 may be configured to use the updated first solution as first solution to be updated in a later iteration.

In accordance with a ninth aspect when referring back to the seventh or eighth aspect, the controller 1006 may be configured for updating the first solution until a deviation between the updated first solution and the first solution is below or equal to a predefined threshold, wherein the updated first solution is used for communication.

In accordance with a tenth aspect when referring back to any of the seventh to ninth aspects, the controller 1006 may be configured for determine a power allocation in the first frequency range and a power allocation in the second frequency range and an allocation of subcarriers used in the first frequency range under the constraints C1, C2, C3 and C4 based on $$C1: \sum_{k=1}^{K}\sum_{i=1}^{N_F} Tr(P^{[i,k]}(P^{[i,k]})^H) \leq P_{BS},$$

$$C2: \sum_{k=1}^{K}\sum_{i=1}^{N_F} Tr(F^{[i,k]}(H_{B \to S}^{[i]} P^{[i,k]}(P^{[i,k]})^H (H_{B \to S}^{[i]})^H + I_M)(F^{[i,k]})^H) \leq MP_S,$$

$$C3: \sum_{k=1}^{K} s^{[i,k]} \leq 1 \forall i,$$

$$C4: s^{[i,k]} \in \{0, 1\} \forall i, k,$$

(6)

wherein Tr denotes the trace of a matrix, $P^{[i,k]}$ denotes an element of a precoding matrix P for UE k of in total K UE and in subcarrier i, $(P^{[i,k]})^H$ denotes the Hermitian transpose of matrix $P^{[i,k]}$, F denotes an amplification matrix, H denotes a M×N MIMO channel matrix, I denotes a unit matrix, $s^{[i,k]}$ describes an allocation of respective subcarrier i to UE k.

In accordance with an eleventh aspect when referring back to any of the first to tenth aspects, the controller 1006 may be configured for determining the second solution based on Karush-Kuhn-Tucker conditions.

In accordance with a twelfth aspect when referring back to any of the first to eleventh aspects, the URU may be one of a plurality of URU ($URU_1$-$URU_M$) in the SUDAS, wherein the controller 1006 may be configured for determining the first solution so as to allocate equal power to each of the plurality of URU and/or equal power to a plurality of antennas of the BS.

In accordance with a thirteenth aspect when referring back to any of the first to twelfth aspects, the controller 1006 may be configured for determining an updated second solution responsive to a variation in a power allocation in the first frequency range.

In accordance with a fourteenth aspect, a URU may be configured for operating in a SUDAS comprising at least the URU, wherein the URU may be configured for relaying a signal between at least one base station (BS) and at least one User Equipment (UE) by communicating with the at least one UE in a first frequency range and with the at least one BS in a second frequency range, the URU comprising a controller 1006 configured for determining a first solution for a resource allocation in the first frequency range.

In accordance with a fifteenth aspect, a base station (BS) may be configured for operating in a SUDAS comprising at least one URU, wherein the at least one URU may be configured for relaying a signal between the BS and at least one User Equipment (UE) by communicating with the at least one UE in a first frequency range and with the BS in a second frequency range, the BS comprising a controller configured for: determining a first solution for a resource allocation in the first frequency range and a second solution for a resource allocation in the second frequency range; and controlling the at least one URU according to the first solution.

In accordance with a sixteenth aspect, a SUDAS may comprise at least one URU, wherein the at least one URU may be configured for relaying a signal between a base station (BS) and a User Equipment (UE), wherein a backend link 306 between the BS and the URU may be characterized by at least one backend parameter 1014a; wherein a frontend link 304 between the URU and the UE is characterized by at least one frontend parameter 1014a; wherein the SUDAS is configured for determining at least one hybrid parameter 1022 using the at least one frontend parameter 1014b and the at least one backend parameter 1014a; wherein the base station is configured for allocating resources for the backend link 306 based on the hybrid parameter.

In accordance with a seventeenth aspect when referring back to the sixteenth aspect, the hybrid parameter 1022 may describe a hybrid channel state information and comprises at least one of a hybrid Signal-to-Noise-Ration (SNR), a hybrid channel coefficient, a hybrid service level, a hybrid modulation coding scheme.

In accordance with an eighteenth aspect when referring back to the sixteenth or seventeenth aspect, the SUDAS may comprise a controller 1006 configured for determining the hybrid parameter 1022 and for signalling the hybrid parameter 1022 to the base station.

In accordance with a nineteenth aspect when referring back to any of the sixteenth to eighteenth aspects, the base station may be configured for allocating the resources for the backend link 306 based on the hybrid parameter 1022 in absence of the dedicated backend parameter.

In accordance with a twentieth aspect when referring back to any of the sixteenth to nineteenth aspects, the hybrid parameter 1022 may describe a quality of a channel between the BS and the UE via the URU.

In accordance with a twenty-first aspect when referring back to any of the sixteenth to twentieth aspects, the SUDAS may be configured for determining the hybrid parameter 1022 based on the rate-distortion theory.

In accordance with a twenty-second aspect when referring back to any of the sixteenth to twenty-first aspects, the base station may be configured for allocating the resources based on a power allocation.

In accordance with a twenty-third aspect, a controller configured for controlling a SUDAS may comprise a base station (BS), a user equipment (UE) and a URU, wherein the controller may comprise: an input interface 1016 for receiving information indicating a backend parameter 1014a characterizing a backend link 306 between the BS and the URU and for receiving a frontend parameter 1014a characterizing a frontend link 306 between the URU and the UE; a processor 1018 for determining a hybrid parameter 1022 using the frontend parameter 1014b and the backend parameter 1014a; and an output interface 1024 for providing the hybrid parameter.

In accordance with a twenty-fourth aspect, a SUDAS may comprise a plurality of URUs, wherein each URU may be configured for relaying a signal between a base station (BS) and a User Equipment (UE); a controller 1006 configured for selecting at least one URU ($URU_1$-$URU_M$) of the plurality of URU for relaying the signal and for controlling the selected URU ($URU_1$-$URU_M$) so as to relay the signal and for controlling an unselected URU (URUM) so as to not relaying the signal.

In accordance with a twenty-fifth aspect when referring back to the twenty-fourth aspect, the controller 1006 may be configured for selecting the at least one URU ($URU_1$-$URU_M$) based on a performance criterion related to a performance of a link between the base station and the UE via the URU.

In accordance with a twenty-sixth aspect when referring back to the twenty-fifth aspect, the performance criterion may be a combined value being based on a first signal-to-noise ratio of a first link 306 between the base station and the URU and on a second signal-to-noise ratio of a second link 304 between the URU and the UE.

In accordance with a twenty-seventh aspect when referring back to any of the twenty-fourth to twenty-sixth aspects, the controller 1006 may be configured for associating a quality parameter to each of the plurality of URU ($URU_1$-$URU_M$), the quality parameter being related to a performance criterion related to a performance of a link between the base station and the UE via the URU, wherein the controller 1006 may be configured for selecting a subset of URU from the plurality of URU ($URU_1$-$URU_M$) for relaying the signal based on an evaluation of the quality parameter.

In accordance with a twenty-eighth aspect when referring back to any of the twenty-fourth to twenty-seventh aspects, the controller 1006 may be configured for associating a quality parameter to each of the plurality of URU ($URU_1$-$URU_M$), the quality parameter being related to a performance criterion related to a performance of a link between the base station and the UE via the URU, wherein the controller 1006 is configured for selecting a subset of URU from the plurality of URU ($URU_1$-$URU_M$) for relaying the signal, the subset having a predefined number of URU such that the subset comprises the URU of the plurality of URU ($URU_1$-$URU_M$) having the highest performance of the link between the base station and the UE.

In accordance with a twenty-ninth aspect when referring back to any of the twenty-fourth to twenty-eighth aspects, the controller 1006 may be configured for associating a quality parameter to each of the plurality of URU ($URU_1$-$URU_M$), the quality parameter being related to a performance criterion related to a performance of a link between the base station and the UE via the URU, wherein the controller 1006 is configured for sorting the plurality of URU ($URU_1$-$URU_M$) based on the performance criterion, for determining a number of URU to be selected from the plurality of URU ($URU_1$-$URU_M$) and for selecting the determined number from the sorted plurality of URU ($URU_1$-$URU_M$).

In accordance with a thirtieth aspect when referring back to the twenty-ninth aspect, the number of URU to be selected may be determined based on MIMO parameters.

In accordance with a thirty-first aspect when referring back to any of the twenty-fourth to thirtieth aspects, the controller 1006 may be configured for determining the subset of URU to be used for relaying the signal based on an optimization formulation maximizing a partial performance criterion related to a performance of links between the URU and the UE.

In accordance with a thirty-second aspect when referring back to the thirty-first aspect, the SUDAS may comprise a plurality of UE, wherein the controller 1006 may be configured for selecting a subset of URU for each UE ($UE_1$-$UE_K$) communicating with the BS, wherein the controller is configured for selecting the plurality of subsets so as to maximize a total throughput of the plurality of URU ($URU_1$-$URU_M$) or to minimize a transmission energy used for relaying signals between the BS and the plurality of UE ($UE_1$-$UE_K$).

In accordance with a thirty-third aspect, a URU configured for communicating with a base station using a first frequency band and for communicating with a UE using a second frequency band so as to relay a signal between the UE and the BS, may comprise: an interface for receiving information relating to at least one further URU configured for relaying a signal between the BS and a same or different UE, wherein the URU and the at least one further URU forms a plurality of URU ($URU_1$-$URU_M$); a controller 1006 configured for selecting at least one URU of the plurality of URU for relaying the signal and for controlling the selected URU so as to relay the signal and for controlling an unselected URU so as to not relaying the signal.

In accordance with a thirty-fourth aspect, a A UE being configured for communicating with a base station (BS), may comprise: an interface for receiving information relating to a plurality of URU ($URU_1$-$URU_M$) configured for relaying a signal between the BS and the UE; and a controller 1006 configured for selecting at least one URU of the plurality of URU ($URU_1$-$URU_M$) for relaying the signal and for controlling the selected URU so as to relay the signal and for controlling an unselected URU so as to not relaying the signal.

In accordance with a thirty-fifth aspect, a base station (BS) being configured for communicating with a UE, may comprise: an interface for receiving information relating to a plurality of URU ($URU_1$-$URU_M$) configured for relaying a signal between the BS and the UE; and a controller 1006 configured for selecting at least one URU of the plurality of URU ($URU_1$-$URU_M$) for relaying the signal and for controlling the selected URU so as to relay the signal and for controlling an unselected URU so as to not relaying the signal.

In accordance with a thirty-sixth aspect, a URU 1400 configured for operating as a relay for relaying a part of a input signal received from a base station (BS) through a backend link to a User Equipment (UE) through a frontend link, wherein the frontend link is established in a frontend frequency band providing a plurality of frontend resources, may comprise: a first interface 1028 for receiving the input signal from the base station, the signal using a plurality of resources 1026; a signal generator 1032 configured for selecting a subset of resources $1026_1$, $1026_j$, $1026_3$ from the plurality of resources 1026 and to provide an output signal using the selected subset of resources; and a second interface 1036 for transmitting the output signal to the UE.

In accordance with a thirty-seventh aspect when referring back to the thirty-sixth aspect, the signal generator 1032 may be configured to provide the output signal in absence of unselected resources.

In accordance with a thirty-eighth aspect when referring back to the thirty-sixth or thirty-seventh aspect, the signal generator 1032 may be configured for discarding unselected parts of the input signal for providing the output signal.

In accordance with a thirty-ninth aspect when referring back to any of the thirty-sixth to thirty-eighth aspects, the URU may be configured for receiving, from the UE and prior to providing the output signal, selection information indicating resources allocated to the UE by a network controller, wherein the signal generator 1032 may be configured for using the selection information for selecting the subset of resources.

In accordance with a fortieth aspect when referring back to any of the thirty-sixth to thirty-ninth aspects, prior to providing the output signal, the URU may be configured for receiving an allocation signal containing information indicating resources available at the BS and allocated to the UE and to relay the allocation signal to the UE; wherein the URU is configured for receiving from the UE and prior to providing the output signal, selection information indicating the allocated resources, wherein the signal generator 1032 is configured for using the selection information for selecting the subset of resources.

In accordance with a forty-first aspect when referring back to any of the thirty-sixth to fortieth aspects, the URU may be configured for receiving, prior to providing the input signal, selection information indicating the resources to be selected for providing the output signal, wherein the signal generator 1032 is configured for discarding the selection information responsive to having received further selection information updating the selection information or responsive to a time elapsed since reception of the selection information.

In accordance with a forty-second aspect when referring back to any of the thirty-sixth to forty-first aspects, the input signal may be received using a plurality of subcarriers of a wireless communication network operated at least partially by the BS, wherein the selection information relates to a subset of subcarriers of the plurality of subcarriers.

In accordance with a forty-third aspect when referring back to any of the thirty-sixth to forty-second aspects, the URU may be configured for providing the output signal based on an amplify and forward scheme, a compress and forward scheme or a decode and forward scheme.

In accordance with a forty-fourth aspect, a User Equipment (UE) may be configured for receiving an allocation signal containing information indicating resources available at a base station (BS) to which the UE is associated and which are allocated to the UE; wherein the UE is configured for transmitting to a URU selection information indicating the allocated resources.

In accordance with a forty-fifth aspect, a URU 1042 configured for operating as a relay for relaying at least a part of an input signal received from a base station (BS) to a User Equipment (UE), may comprise: a first interface 1044 for receiving the input signal from the base station (BS), the input signal comprising payload data; a signal generator 1048 configured for incrementally coding the payload data so as to obtain a plurality of incremental payload partitions, and for providing an output signal 1047 by coding the plurality of incremental payload partitions; and a second interface 1046 configured for transmitting the output signal.

In accordance with a forty-sixth aspect when referring back to the forty-fifth aspect, the signal generator 1048 may be configured to provide the output signal so as to use a plurality of resources for transmitting the output signal 1047, wherein the signal generator 1048 may be configured to provide the output signal 1047 so as to utilize at least one resource of the plurality of resources for each incremental payload partition of the plurality of incremental payload partitions; wherein at least a first resource utilized for a first incremental payload partition of the plurality of incremental code partitions and a second resource utilized for a second incremental payload partition of the plurality of incremental payload partitions are non-orthogonal with respect to each other.

In accordance with a forty-seventh aspect when referring back to the forty-fifth or forty-sixth aspect, the signal generator 1048 may be configured for incrementally coding the payload data based on a varying code rate used for coding the plurality of payload partitions such that a combination of an increasing number of payload partitions corresponds to the payload data being coded with an increasing code rate.

In accordance with a forty-eighth aspect when referring back to any of the forty-fifth to forty-seventh aspects, the signal generator 1048 may be configured for obtaining information indicating a signal quality; of a link between the URU and a UE, wherein the signal generator 1048 may be configured for using an associated code rate for coding the payload data so as to obtain the plurality of incremental payload partitions; wherein the signal generator 1048 may be configured for adapting at least one of the associated code rates based on the information indicating the signal quality.

In accordance with a forty-ninth aspect when referring back to any of the forty-fifth to forty-eighth aspects, the signal generator 1048 may be configured for obtaining information indicating a number of UE receiving the output signal; wherein the signal generator 1048 may be configured, for obtaining different payload partitions, for using a different code rate for a different UE and to adapt a number of incremental code partitions used for obtaining the plurality of incremental payload partitions based on the number of UE.

In accordance with a fiftieth aspect when referring back to the forty-ninth aspect, the signal generator 1048 may be configured to adapt the number of the incremental code partitions so as to correspond to the number of UE.

In accordance with a fifty-first aspect when referring back to the fiftieth aspect, the signal generator 1048 may be configured for evaluating the number of UE and to adapt the number of the incremental code partitions so as to correspond to the number of UE while the number of UE is at most a UE threshold value or smaller than the UE threshold value; and wherein, for a number of UE exceeding the UE threshold value, the signal generator 1048 may be configured for grouping the plurality of UE into a number of groups of UE such that the number of groups is at most the UE threshold value or smaller than the UE threshold value and to adapt the number of the incremental code partitions so as to correspond to the number of groups of UE.

In accordance with a fifty-second aspect when referring back to the fifty-first aspect, the signal generator 1048 may be configured for grouping the UE based on a link quality of a link between the respective UE and the URU such that similar qualities of links are grouped together.

In accordance with a fifty-third aspect when referring back to any of the forty-fifth to fifty-second aspects, the signal generator 1048 may be configured for providing the output signal 1047 by executing a superposition coding on the plurality of incremental payload partitions.

In accordance with a fifty-fourth aspect when referring back to any of the forty-fifth to fifty-third aspects, for incrementally coding the payload data, the signal generator 1048 may be configured for mapping the payload data to a code having a first code rate and for rate splitting the first code rate so as to obtain a plurality of incremental code rates.

In accordance with a fifty-fifth aspect, a UE 1600 configured for receiving a signal 1047 from a URU, the signal 1047 comprising payload data being incrementally coded with a plurality of incremental code partitions, may comprise: a decoder 1054 configured for decoding the signal 1047 so as to obtain decoded payload partitions 1056 from the signal 1047 based on the incremental code partitions; an evaluator 1058 configured for evaluating if a payload partition has been decoded successfully or unsuccessfully; and a combiner 1062 configured for combining payload partitions 1056₁, 1056₂ being decoded successfully so as to obtain decoded payload data 1064 based on the successfully decoded combined payload partitions.

In accordance with a fifty-sixth aspect when referring back to the fifty-fifth aspect, the combiner 1062 may be configured for dismissing payload partitions 1056₃ being decoded unsuccessfully.

In accordance with a fifty-seventh aspect, a network may comprise: at least one base station; a plurality of UE according to the fifty-fifth or fifty-sixth aspect; at least one URU according to any of the forty-fifth to fifty-fourth aspects configured for relaying a signal from the at least one BS to the plurality of UE; wherein, a first UE of the plurality of UE is configured for successfully decoding the payload data of the signal with a first code rate and wherein a second UE of the plurality of UE is configured for successfully decoding the payload data with a second code rate.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Energy-Efficient 5G Outdoor-to-Indoor Communication: SUDAS Over Licensed and Unlicensed Spectrum, Kwan et al.
[2] Resource Allocation for Outdoor-to-Indoor Compress-and-Forward SUDAS with Independent Relay Processing, Krishnamoorthy et al.
[3] Resource Allocation in a Distributed Antenna System, Meysam Goodarzi
[4] WO 2016/030300 A1
[5] WO 2016/030394 A2
[6] EP 2 991 441 A2
[7] N. Alliance, "NGMN 5G white paper," Next Generation Mobile Net-works Ltd, Frankfurt am Main, 2015.
[8] P. Aimers, F. Tufvesson, and A. F. Molisch, "Keyhole effect in MIMO wireless channels: Measurements and theory," IEEE Trans. Wireless Commun., vol. 5, no. 12, 2006.
[9] M. Dohler, "Virtual antenna arrays," Ph.D. dissertation, King's College London, University of London, November 2003.
[10] M. Dohler, J. Dominguez, and H. Aghvami, "Link capacity analysis for virtual antenna arrays," vol. 1, pp. 440-443 vol. 1, 2002.
[11] W. Choi and J. G. Andrews, "Downlink performance and capacity of distributed antenna systems in a multicell environment," IEEE Trans. Wireless Commun., vol. 6, no. 1, 2007.
[12] D. W. K. Ng, M. Breiling, C. Rohde, F. Burkhardt, and R. Schober, "Energy-efficient 5G outdoor-to-indoor communication: SUDAS over licensed and unlicensed spectrum," IEEE Trans. Wireless Commun., vol. 15, no. 5, pp. 3170-3186, 2016.

[13] M. Breiling, D. Ng, C. Rohde, F. Burkhardt, and R. Schober, "Resource allocation for outdoor-to-indoor multicarrier transmission with shared UE-side distributed antenna systems," in Vehicular Technology Conference (VTC Spring), 2015 IEEE 81st, 2015, pp. 1-7.
[14] J. C. Bezdek and R. J. Hathaway, "Convergence of alternating optimization," Neural, Parallel & Scientific Computations, vol. 11, no. 4, pp. 351-368, 2003.
[15] T. M. Cover and J. A. Thomas, Elements of Information Theory. John Wiley & Sons, 2012.
[16] Y. Rong, X. Tang, and Y. Hua, "A unified framework for optimizing linear nonregenerative multicarrier MIMO relay communication systems," IEEE Trans. Signal Process., vol. 57, no. 12, pp. 4837-4851, 2009.
[17] X. Wang and G. B. Giannakis, "Resource allocation for wireless multiuser OFDM networks," IEEE Trans. Inf. Theory, vol. 57, no. 7, pp. 4359-4372, 2011.
[18] W. Yu and R. Lui, "Dual methods for nonconvex spectrum optimization of multicarrier systems," IEEE Trans. Commun., vol. 54, no. 7, pp. 1310-1322, 2006.
[19] S. Jaeckel, L. Raschkowski, K. Börner, L. Thiele, F. Burkhardt, and E. Eberlein, "QuaDRiGa-Quasi Deterministic Radio Channel Generator, User manual and documentation," Fraunhofer Heinrich Hertz Institute, 2014.
[20] A. Maltsev, R. Maslennikov, A. Sevastyanov, A. Lomayev, and A. Khoryaev, "Statistical channel model for 60 GHz WLAN systems in conference room environment," pp. 1-5, 2010.

The invention claimed is:

1. A shared user equipment-side distributed antenna system (SUDAS) comprising at least one UE-side radio unit (URU), wherein the at least one URU is configured for relaying a signal between at least one base station (BS) and at least one User Equipment (UE) by communicating with the at least one UE in a first frequency range and with the at least one BS in a second frequency range, the SUDAS comprising:
a controller configured for determining a first solution for a resource allocation in the first frequency range for a communication between the UE and the URU;
wherein the base station is configured for determining a second solution for a resource allocation in the second frequency range for a communication between the BS and the URU using the first solution.

2. The SUDAS of claim 1, comprising a plurality of URU, wherein the controller is configured for determining a first solution for each of the plurality of URU so as to acquire a plurality of first solutions, wherein the base station is configured for determining the second solution based receiving information indicating the plurality of first solutions.

3. The SUDAS of claim 2, further comprising a plurality of BS, wherein each of the URU is configured for communicating with each of the BS using an associated backend link in the second frequency range, wherein each BS is configured for determining a second solution for each backend link associated with the BS.

4. The SUDAS of claim 2, wherein the plurality of BS is non-cooperative; and wherein the SUDAS comprises a plurality of UE, wherein each URU is configured for communicating with at least one UE of the plurality of UE using an associated frontend link in the first frequency range, wherein each of the plurality of URU is configured for determining the first solution based on a combination of the frontend links associated with the URU.

5. The SUDAS of claim 1,
wherein the controller is configured for updating the first solution so as to acquire an updated first solution using the second solution.

6. The SUDAS of claim 5, wherein the controller is configured for updating the first solution until a deviation between the updated first solution and the first solution is below or equal to a predefined threshold, wherein the updated first solution is used for communication.

7. The SUDAS of claim 5, wherein the controller is configured for determine a power allocation in the first frequency range and a power allocation in the second frequency range and an allocation of subcarriers used in the first frequency range under the constraints C1, C2, C3 and C4 based on $$C1: \sum_{k=1}^{K}\sum_{i=1}^{N_F} Tr(P^{[i,k]}(P^{[i,k]})^H) \leq P_{BS}, \quad (6)$$

$$C2: \sum_{k=1}^{K}\sum_{i=1}^{N_F} Tr(F^{[i,k]}(H_{B\to S}^{[i]} P^{[i,k]}(P^{[i,k]})^H (H_{B\to S}^{[i]})^H + I_M)(F^{[i,k]})^H) \leq MP_S,$$

$$C3: \sum_{k=1}^{K} s^{[i,k]} \leq 1 \forall i,$$

$$C4: s^{[i,k]} \in \{0, 1\} \forall i, k,$$

wherein Tr denotes the trace of a matrix, $P^{[i,k]}$ denotes an element of a precoding matrix P for UE k of in total K UE and in subcarrier i, $(P^{[i,k]})^H$ denotes the Hermitian transpose of matrix $P^{[i,k]}$, F denotes an amplification matrix, H denotes a M×N MIMO channel matrix, I denotes a unit matrix, $s^{[i,k]}$ describes an allocation of respective subcarrier i to UE k.

8. The SUDAS of claim 1, wherein the controller is configured for determining the second solution based on Karush-Kuhn-Tucker conditions.

9. The SUDAS of claim 1, wherein the URU is one of a plurality of URU in the SUDAS, wherein the controller is configured for determining the first solution so as to allocate equal power to each of the plurality of URU and/or equal power to a plurality of antennas of the BS.

10. The SUDAS of claim 1, wherein the controller is adapted for determining the second resource allocation using the first resource allocation to obtain an optimization criterion for the UE.

* * * * *